US007599909B2

(12) United States Patent
Aldridge

(10) Patent No.: US 7,599,909 B2
(45) Date of Patent: *Oct. 6, 2009

(54) SYSTEM AND METHOD FOR TRANSFORMING AND USING CONTENT IN OTHER SYSTEMS

(75) Inventor: Gregory E. Aldridge, Kokomo, IN (US)

(73) Assignee: Theoris Software, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/873,660

(22) Filed: Oct. 17, 2007

(65) Prior Publication Data

US 2008/0040309 A1 Feb. 14, 2008

Related U.S. Application Data

(63) Continuation of application No. 10/802,442, filed on Mar. 17, 2004, now Pat. No. 7,302,421.

(51) Int. Cl.
*G06F 17/30* (2006.01)

(52) U.S. Cl. .......................................... 707/2; 707/101

(58) Field of Classification Search ..................... 707/2, 707/100, 101, 102, 200; 715/513
See application file for complete search history.

(56) References Cited

U.S. PATENT DOCUMENTS

2004/0019542 A1 * 1/2004 Fuchs et al. .................. 705/32
2004/0027368 A1 * 2/2004 Snyder et al. ............... 345/716

* cited by examiner

*Primary Examiner*—Cheryl Lewis
(74) *Attorney, Agent, or Firm*—Woodard, Emhardt, Moriarty, McNett & Henry LLP

(57) ABSTRACT

A computer system and method is disclosed that transforms data for use in other applications. Several client workstations and servers are coupled together over a network. A client computer contains a user interface for performing the mapping and transformation. Data elements are mapped from a data source to a multi-dimensional cube. The multi-dimensional cube is transformed into a test recordset to determine if the data elements are mapped correctly. The mapping information is saved to a template. A server includes business logic for using the saved template to create a final recordset from the data source using the template. The server sends at least part of the recordset to a browser user interface on a client computer for display.

20 Claims, 33 Drawing Sheets

240

Semi-monthly Time Reporting By Year

| | | | 1999 | | 2000 | |
|---|---|---|---|---|---|---|
| | | | Actual | Budget | Actual | Budget |
| Q1 | January | 1 | 125 | 343 | 432 | 34 |
| | | 2 | 432 | 233 | 54 | 23 |
| | February | 1 | 653 | 332 | 765 | 34 |
| | | 2 | 243 | 422 | 234 | 234 |
| | March | 1 | 231 | 76 | 65 | 543 |
| | | 2 | 653 | 324 | 24 | 23 |
| Q2 | April | 1 | 342 | 65 | 453 | 234 |
| | | 2 | 642 | 324 | 54 | 654 |
| | May | 1 | 452 | 654 | 324 | 23 |
| | | 2 | 357 | 234 | 465 | 54 |
| | June | 1 | 435 | 543 | 23 | 23 |
| | | 2 | 432 | 234 | 547 | 45 |

SYSTEM AND METHOD FOR TRANSFORMING AND USING CONTENT IN OTHER SYSTEMS

CROSS REFERENCE TO RELATED APPLICATIONS

The present application is a continuation of U.S. patent application Ser. No. 10/802,442 now U.S. Pat. No. 7,302,421, filed Mar. 17, 2004 entitled "System and Method for Transforming and Using Content in Other Systems," which is hereby incorporated by reference in its entirety.

BACKGROUND

Often, key corporate performance information contained in electronic reports is simply not available in a lower level system in a structured format. The primary reason is that substantial business logic often resides in report authoring tools. Such business logic could be located within ETL (Extract, Transform, and Load) processes so that the outputs would be available in a structured manner (typically the relational database management system) to subscribing systems for presentation. There are many reasons why this is often not the case in the real world. With the high incidence of merger and acquisition activity, it is often the case that at a given point in time, a corporation may have multiple ERP (Enterprise Resource Planning) systems, multiple data warehouses with disparate ETL tools and processes, and key business information residing in Excel® spreadsheets, Access® databases, and other similar data formats. With this reality, it is not surprising that much of the integration required to present key performance information is ultimately accomplished within the reporting environment where information can be integrated and cleansed much more rapidly than changes can be made to the data warehouses or source systems.

For the above reasons, reports are sometimes the best source for some systems to retrieve certain types of information. However, the problem that is quickly encountered is that most reporting tools do not provide a means to access the information as it appears in the report. For example, in the BUSINESS OBJECTS® report tool it is possible to obtain the data in the data provider, but this is prior to any calculation or formatting. It is likely that the report tool vendors do not provide this capability because the report is considered to be the final output of the system, not as a data source for higher-level presentation. Some companies have attempted to solve this problem of obtaining information from reporting systems by "scraping" a document that is intended primarily for viewing. Screen scraping has numerous limitations and does not allow the underlying data to easily be presented in different ways.

Many reporting systems have the ability to produce the reports in HTML or other similar formats. Several systems have been developed for the purpose of converting HTML pages or other such documents to structured formats, such as XML. The immediate problem these systems encounter is that HTML is not a structured data source. Each of these systems suffer significant limitations when the system is applied to documents with complex layouts and multi-dimensional relationships, such as business reports. These systems extract information from fairly simple HTML documents that are published on the Web and contain content that is semi-structured in one or more basic tables. Most of these systems rely on the structure of the document as a basis for evaluating the relationship between data elements within the document. While this is useful for fairly simple documents, especially those manually coded for the Web, the reliance on internal document structure breaks down completely for documents that have complex layouts with multiple dimensions, cross-tabs and multiple nested tables.

Many of the current systems do not consider the hierarchical nature of information in reports. Other systems that do treat information hierarchically still fail to capture the multi-dimensional nature of the information and often rely heavily on the underlying document structure for the definition of the relationship. Thus, while they are able to map several columns of an HTML table to a tree, they are not able to handle multi-dimensional cross-tab reports with multiple nested tables. Thus, further advancements are needed in these areas.

SUMMARY

One form of the present invention is a unique system for transforming content for use in other applications.

Other forms include unique systems and methods to transform and use content in other applications. Yet another form includes unique systems and methods to transform an unstructured or semi-structured document into a recordset.

Another form includes operating a computer system that has several client workstations and servers coupled together over a network. At least one client computer contains a conversion tool user interface for mapping a data source to a multi-dimensional cube, transforming the cube into a recordset to test the mapping, and saving the mapping as a template. At least one server includes business logic for using the saved template to create a final recordset from the data source and to send at least part of the recordset to the browser user interface for display. At least one client computer contains a browser user interface for receiving and displaying at least part of the data from the recordset.

Another form includes a computer system and method that transforms content from a data source, such as a report, for use in other systems. Data elements are mapped from a data source to a multi-dimensional cube. The multi-dimensional cube is transformed into a test recordset to determine if the data elements are mapped correctly. The mapping information is saved to a template. A final recordset is generated from the data source using the template, and at least part of the final recordset is used in another application.

Yet other forms, embodiments, objects, advantages, benefits, features, and aspects of the present invention will become apparent from the detailed description and drawings contained herein.

BRIEF DESCRIPTION OF THE DRAWINGS

FIG. 9 is a sample HTML report that can be used as a data source for the system of FIG. 1.

DETAILED DESCRIPTION OF PREFERRED EMBODIMENTS

Figure 1:
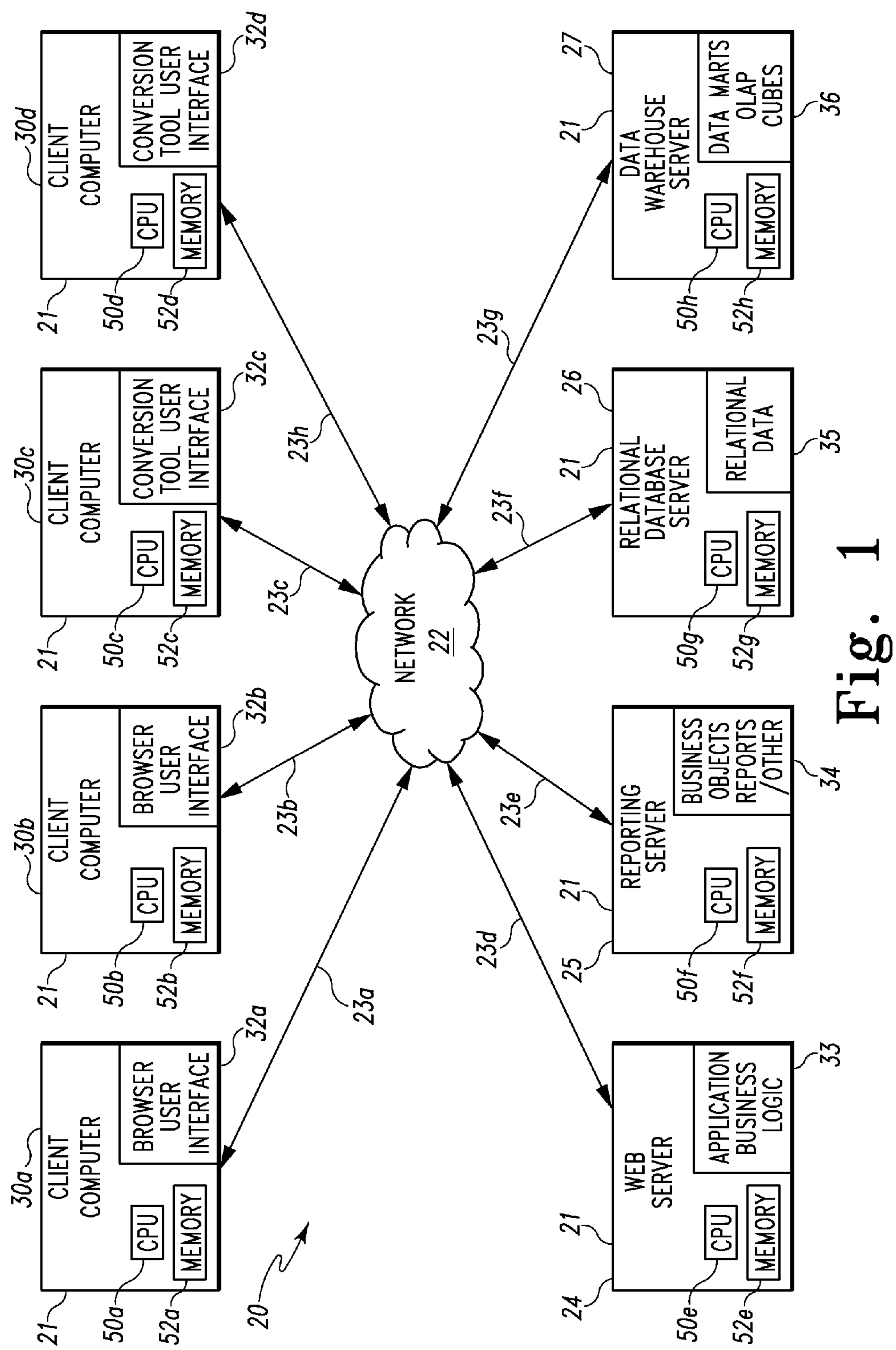
FIG. 1 is a diagrammatic view of a computer system of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention includes a unique system for transforming and using content in other systems. FIG. 1 is a diagrammatic view of computer system 20 of one embodiment of the present invention. Computer system 20 includes computer network 22. Computer network 22 couples together a number of computers 21 over network pathways 23*a-h*. More specifically, system 20 includes several servers, namely Web Server 24, Reporting Server 25, Relational Database Server 26, and Data Warehouse Server 27. System 20 also includes client workstations 30*a*, 30*b*, 30*c*, and 30*d* (collectively 30). While computers 21 are each illustrated as being a server or client, it should be understood that any of computers 21 may be arranged to include both a client and server. Furthermore, it should be understood that while eight computers 21 are illustrated, more or fewer may be utilized in alternative embodiments.

Computers 21 include one or more processors or CPUs (50*a*, 50*b*, 50*c*, 50*d*, 50*e*, 50*f*, 50*g*, and 50*h*, respectively) and one or more types of memory (52*a*, 52*b*, 52*c*, 52*d*, 52*e*, 52*f*, 52*g*, and 52*h*, respectively). Each memory 52*a*, 52*b*, 52*c*, 52*d*, 52*e*, 52*f*, 52*g*, and 52*h* includes a removable memory device. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown to preserve clarity, in one embodiment each computer 21 is coupled to a display. Computers may be of the same type, or a heterogeneous combination of different computing devices. Likewise, displays may be of the same type, or a heterogeneous combination of different visual devices. Although again not shown to preserve clarity, each computer 21 may also include one or more operator input devices such as a keyboard, mouse, track ball, light pen, and/or microtelecommunicator, to name just a few representative examples. Also, besides a display, one or more other output devices may be included such as loudspeaker(s) and/or a printer. Various display and input device arrangements are possible.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22.

In one embodiment, system 20 operates at one or more physical locations where Web Server 24 is configured as a web server that hosts application business logic 33, Reporting Server 25 is configured as a reporting server for processing BUSINESS OBJECTS® reports or other corporate reporting systems 34, Relational Database Server 26 is configured as a database server for storing relational data 35, Data Warehouse Server 27 is configured as a data warehouse server for storing warehouse data such as data marts or OLAP cubes 36, client workstations 30*a* and 30*b* are configured for providing a browser-based user interface 32*a* and 32*b*, respectively, and client workstations 30*c* and 30*d* are configured for providing a conversion tool user interface 32*c* and 32*d*, respectively. Typical applications of system 20 would include more or fewer client workstations of this type at one or more physical locations, but four have been illustrated in FIG. 1 to preserve clarity. Furthermore, although four servers are shown, it will be appreciated by those of ordinary skill in the art that the one or more features provided by Web Server 24, Reporting Server 25, Relational Database Server 26, and Data Warehouse Server 27 could be provided on the same computer or varying other arrangements of computers at one or more physical locations and still be within the spirit of the invention. Farms of dedicated servers could also be provided to support the specific features if desired.

In one embodiment, conversion tool user interface (32*c* and 32*d*) is a standalone application containing both user interface code and business logic code that builds a transformation template and test recordset from a specified data source, as described herein. In such an arrangement, application business logic 33 on web server 24 contains business logic for browser user interface (32*a* and 32*b*) and also contains at least a portion of the same business logic used in the standalone conversion tool (32*c* and 32*d*) so that a recordset for use in browser user interface (32*a* and 32*b*) can be generated from the data source using the template upon demand. Various other arrangements are also possible, as would occur to one of skill in the art. As one non-limiting example, conversion tool (32*c* and 32*d*) could be a client/server application having all business logic included on a server, such as in application business logic 33 of web server 24.

As illustrated and described in greater detail hereinafter, system 20 in a preferred embodiment is able to extract information from static and dynamic data sources such as electronic reports, regardless of structure, while allowing the user to apply his domain expertise to define relationships between data elements, as they are perceived from the document. Any of servers 24-27 can be used as such a data source. In one embodiment, a data source document contains a set of data elements that are related to each other in a multi-dimensional, hierarchical manner that may only be apparent to a viewer of the document. Using a conversion tool user interface (32*c* or 32*d*) the user can generate a cube structure by focusing on a single dimension at a time, specifying the levels of that dimension with no concern for how it relates to other dimensions. If the data source is dynamic, the user specifies rules that will be evaluated to generate the multi-dimensional cube. After building a multi-dimensional cube based on the static or dynamic data source, system 20 transforms the cube into a de-normalized recordset that captures the dimensional relationships. The hidden structure of the document may be used as an aid to grouping data elements into recordsets, but does not limit how such recordsets may be constructed. The resulting recordset can then be generated upon demand for use within other applications, such as a dashboard application displayed in a browser user interface (32*a* or 32*b*).

Figure 2:
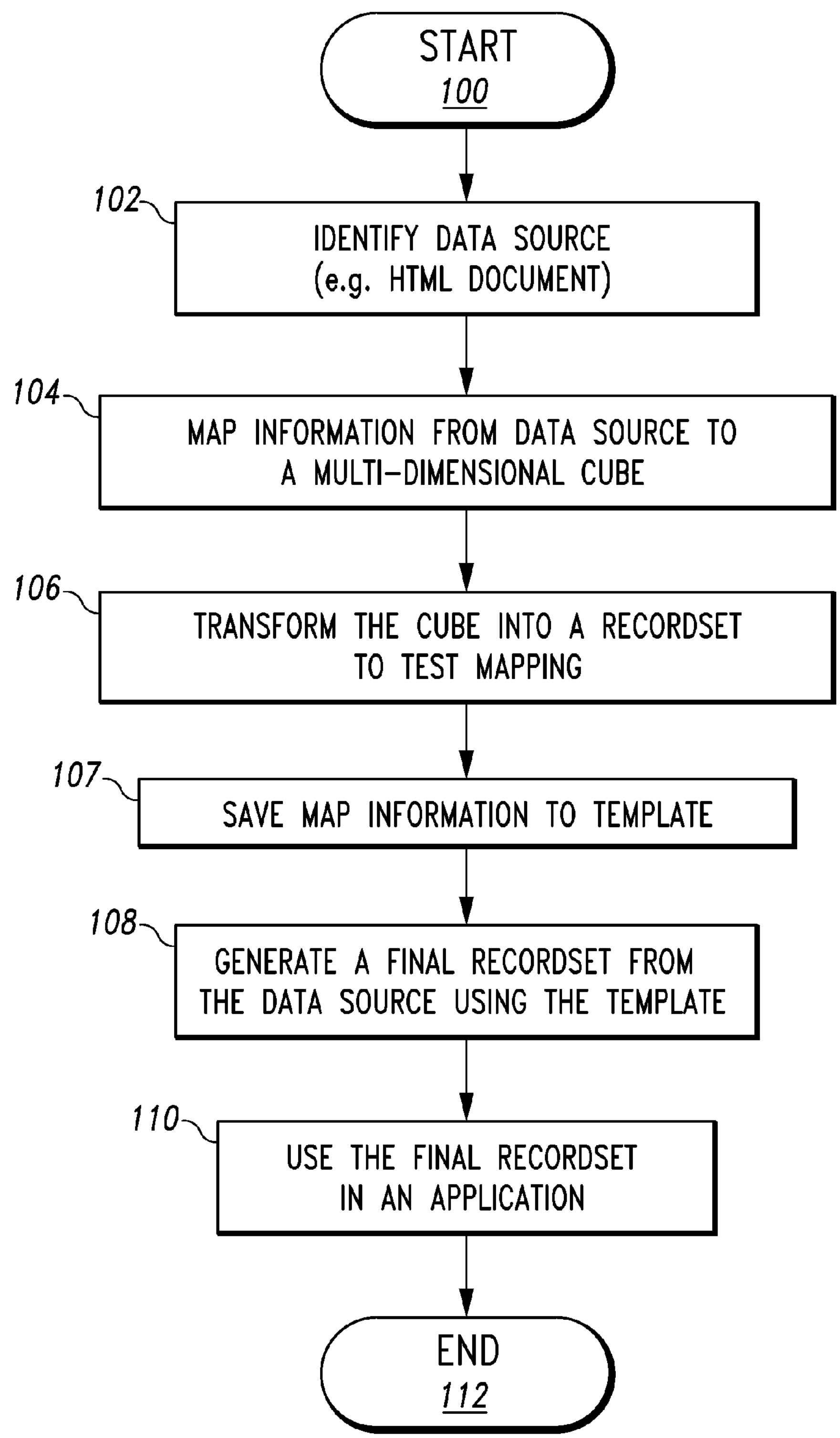
FIG. 2 is a high-level process flow diagram for the system of FIG. 1.

Referring also to FIG. 2, one embodiment for implementing system 20 is illustrated in flow chart form as procedure 100, which demonstrates a high-level process for the system of FIG. 1 and will be discussed in more detail below. In one form, procedure 100 is at least partially implemented in the operating logic of system 20. Procedure 100 begins with identifying a data source to transform for use in other systems (stage 102). Using the conversion tool user interface (32*c* or 32*d*), the information is mapped from the data source to a multi-dimensional cube (stage 104). The cube is optionally transformed to a recordset to test the mapping (stage 106). The mapped information is saved to a template (stage 107). When an application such as browser user interface (32*a* or 32*b*) requests the transformed data, a final recordset is generated from the current data in the data source using the template (stage 108). In one embodiment, application business logic 33 on web server 24 receives a request from a browser user interface (32*a* or 32*b*) for the transformed data, and then uses the template to transform the data into a final recordset. The final recordset is then returned to the browser user interface (32*a* or 32*b*) as requested. The final recordset is then used in the application (stage 110). The process then ends at stage 112.

Figure 3A:
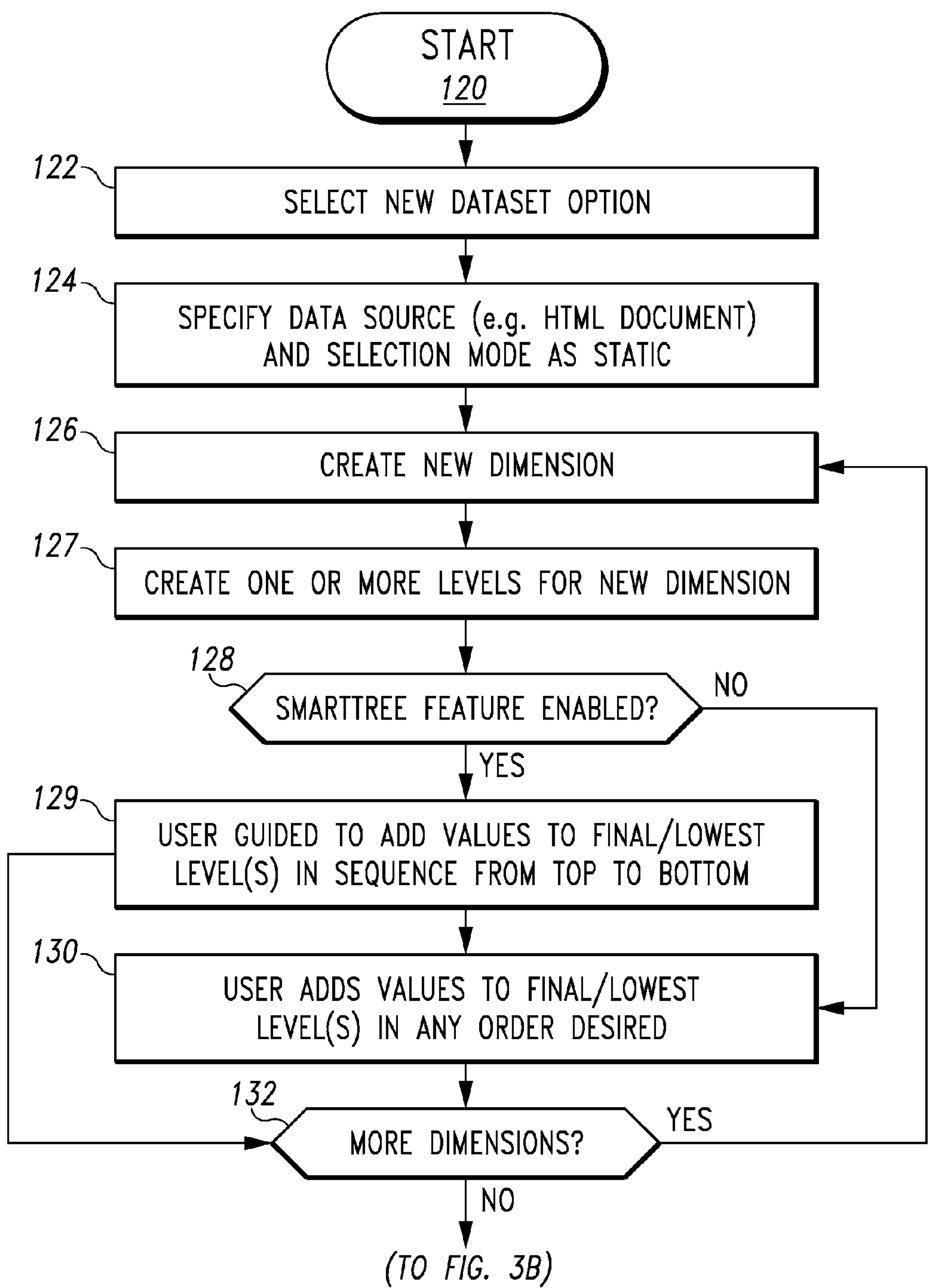
FIG. 3A is a first part process flow diagram for the system of FIG. 1 demonstrating the stages involved in mapping information from a static data source layout to a multi-dimensional cube.
Figure 3B:
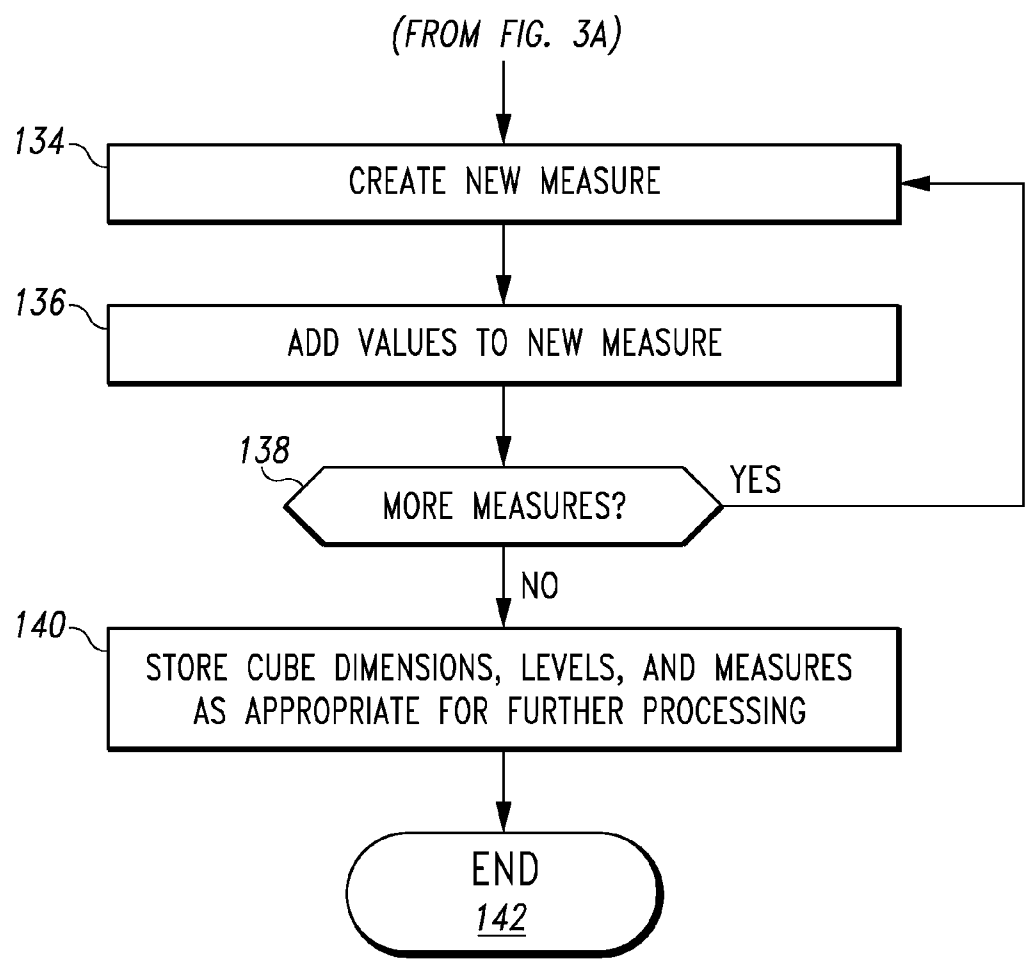
FIG. 3B is a second part process flow diagram for the system of FIG. 1 demonstrating the stages involved in mapping information from a static data source layout to a multi-dimensional cube.

Turning now to FIGS. 3A-3B, procedure 120 demonstrates the stages involved in mapping information from a static data source layout to dimensions, levels, and measures of a multi-dimensional cube. A dimension has levels containing values. One non-limiting example of a dimension is "Period" having levels "Year", "Quarter" and "Month" with values for a given month, which is the lowest level. A measure is a set of document elements containing measurable values. A few non-limiting examples of measures include "Revenue", "Costs" and "Sales" and their corresponding values. In one form, procedure 120 is at least partially implemented in the operating logic of system 20. Procedure 120 begins on FIG. 3A with the user selecting a new recordset option (stage 122). The user specifies a data source to use for building the recordset, such as an HTML report, and sets the selection mode option to "static element" (stage 124). The user selects an option to create a new dimension (stage 126) and creates one or more levels for the new dimension (stage 127). If the smarttree feature is enabled (decision point 128), then the user is guided to add values to the final/lowest level(s) in sequence from top to bottom (stage 129). If the smarttree feature is not enabled (decision point 128), then the user adds the values to the final/lowest level(s) in any order desired (stage 130). If the user desires to add more dimensions (decision point 132) then stages 126-130 are repeated.

Continuing with FIG. 3B, the user creates a new measure (stage 134) and adds values from the data source to the new measure (stage 136). If the user desires to add more measures (decision point 138) then stages 134-136 are repeated. The cube dimensions, levels, and measures can be stored as appropriate for further processing (stage 140). The procedure then ends at stage 142. This procedure will be illustrated in detail in FIGS. 7-19.

Figure 4A:
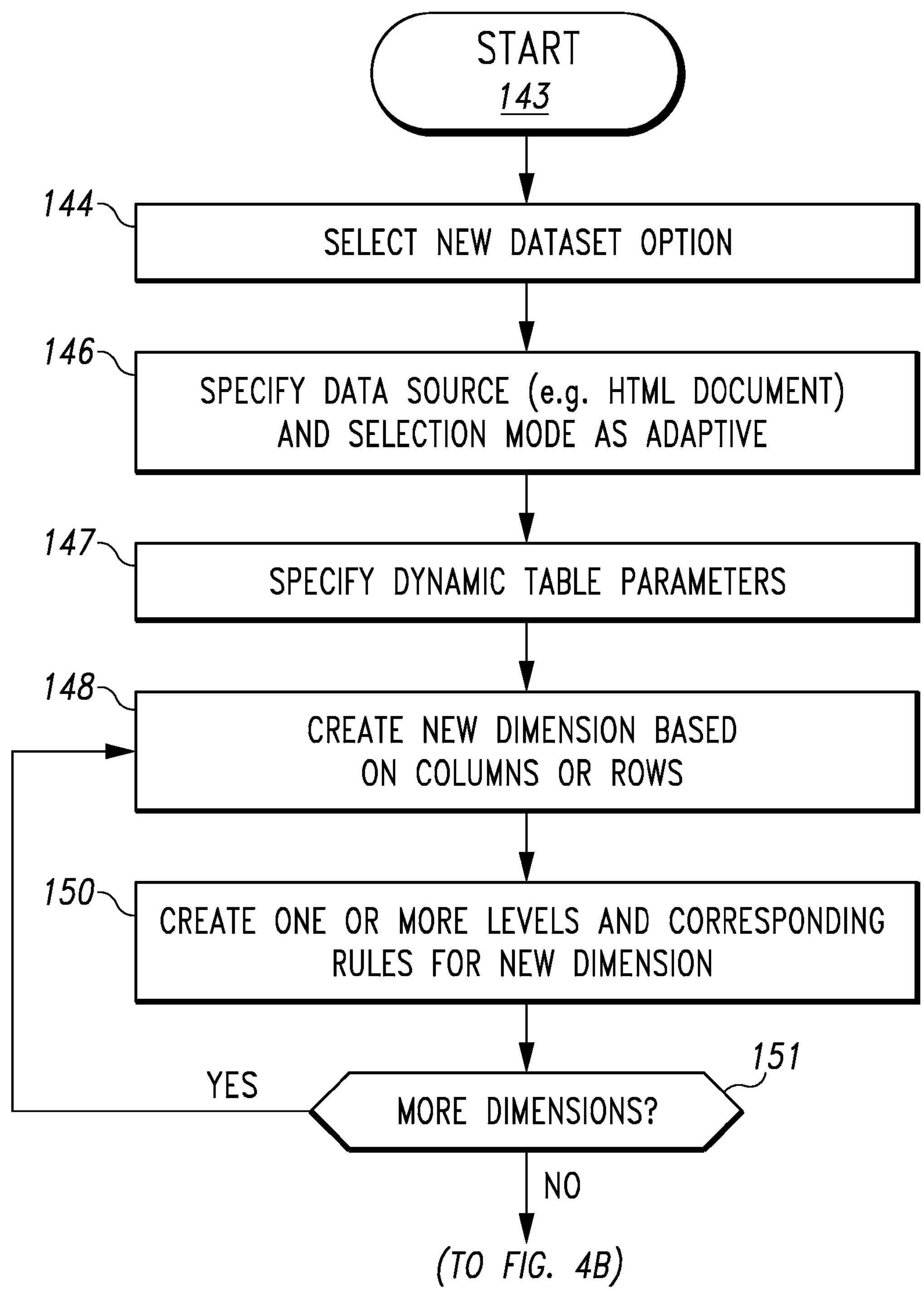
FIG. 4A is a first part process flow diagram for the system of FIG. 1 demonstrating the stages involved in mapping information from a dynamic data source layout to a multi-dimensional cube.
Figure 4B:
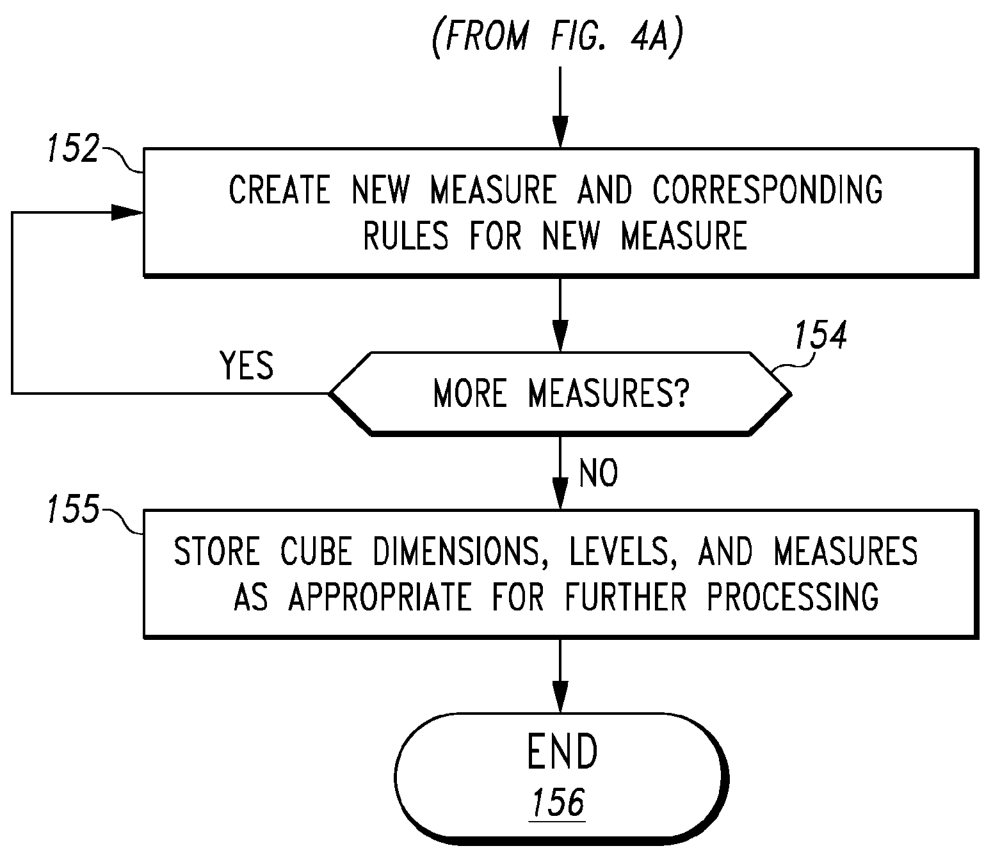
FIG. 4B is a second part process flow diagram for the system of FIG. 1 demonstrating the stages involved in mapping information from a dynamic data source layout to a multi-dimensional cube.

Turning now to FIGS. 4A-4B, procedure 143 demonstrates the stages involved in mapping information from a dynamic data source layout to dimensions, levels, and measures of a multi-dimensional cube. A dynamic data source is one that may change in the number of rows or columns that it contains, or that may otherwise change positions or content within a document. In one form, procedure 143 is at least partially implemented in the operating logic of system 20. Procedure 143 begins on FIG. 4A with the user selecting a new dataset option (stage 144). The user specifies a data source to use for building the recordset, such as an HTML report, and sets the selection mode option to "adaptive table" (stage 146). The user specifies dynamic table parameters with corresponding weighted percentages (stage 147) that will be used to identify and locate the particular table in the event that the data source has changed. In one embodiment, these parameters represent weightings that indicate how the user expects the data source to change.

The user selects an option to create a new dimension and specifies an option to indicate whether the dimension is based on columns or rows of data (stage 148). One or more levels are added for the new dimension, each level having a corresponding rule that specifies how the level will be generated (stage 150). As one non-limiting example, the rule may specify criteria such as to use values from Column 1 starting from the Top to Bottom where the text has 2 characters and starts with the letter Q. Stages 148 and 150 repeat for each dimension (stage 151).

Turning now to FIG. 4B, once the dimensions have been created, the user creates a new measure and corresponding rules for the new measure (stage 152). Stage 152 repeats for each measure (stage 154). Once the dimensions, levels, and measures have been generated with their corresponding rules, they are stored as appropriate for further processing (stage 155). The process then ends at stage 156.

Figure 5:
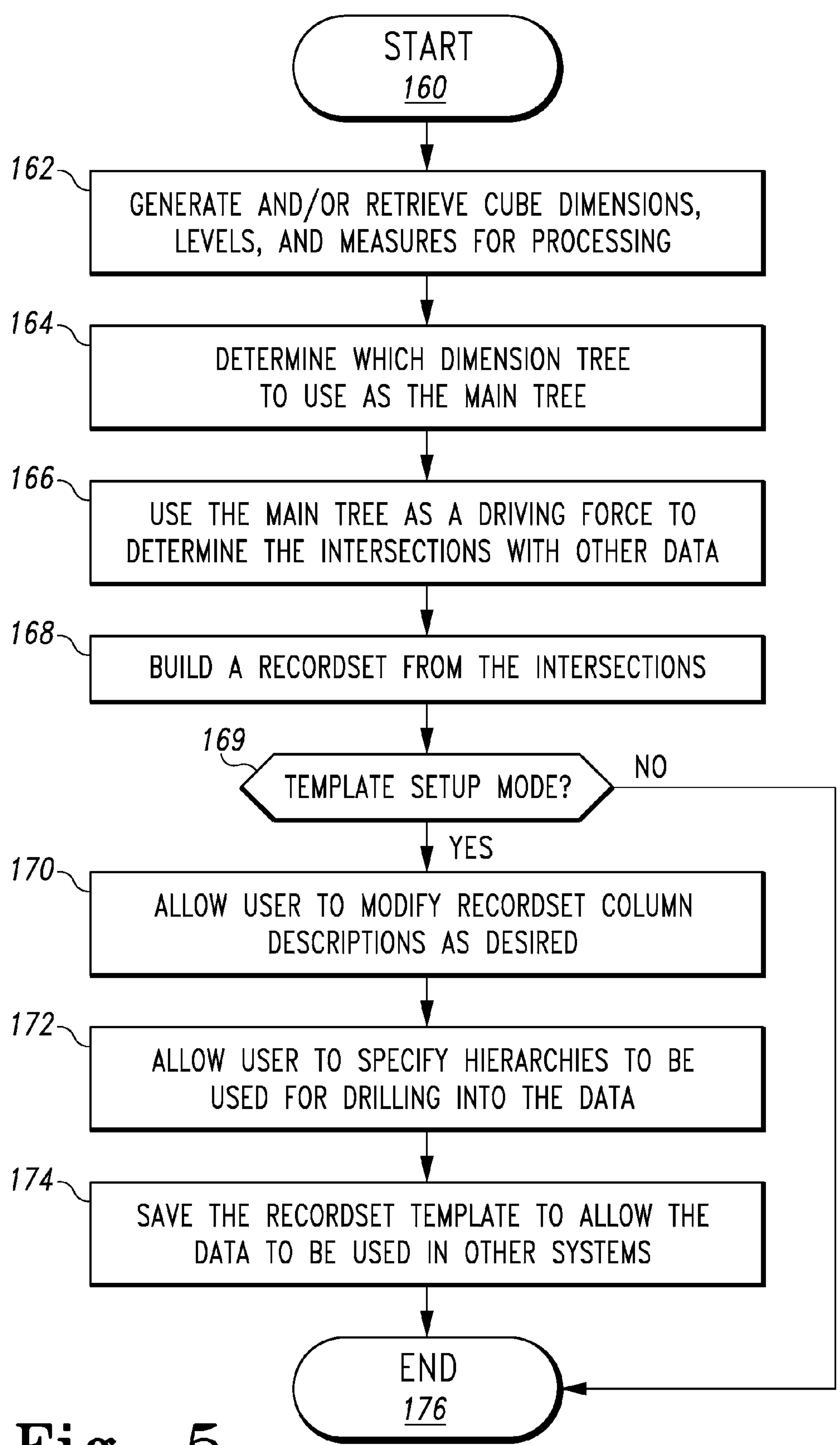
FIG. 5 is a process flow diagram for the system of FIG. 1 demonstrating the high-level stages involved transforming the cube into a recordset.

Turning now to FIG. 5, procedure 160 demonstrates the high level stages involved in transforming the cube into a recordset. In one form, procedure 160 is at least partially implemented in the operating logic of system 20. Procedure 160 begins with generating and/or retrieving and/or the cube dimensions, levels, and measures for processing (stage 162). The system then determines which dimension tree to use as the main tree (stage 164). The main tree is then used as a driving force to determine the intersections with other data (stage 166). A recordset it built from the intersections (stage 168). If the template is not being setup or modified (decision point 169), then the procedure ends at stage 176. If the template is being setup or modified (decision point 169), the user can modify the recordset column descriptions as desired (stage 170). The user can also specify hierarchies to be used for drilling into the data (stage 172). The recordset template is saved to allow the data to be transformed and used at a later time in other systems (stage 174). The procedures then ends at stage 176.

Figure 6A:
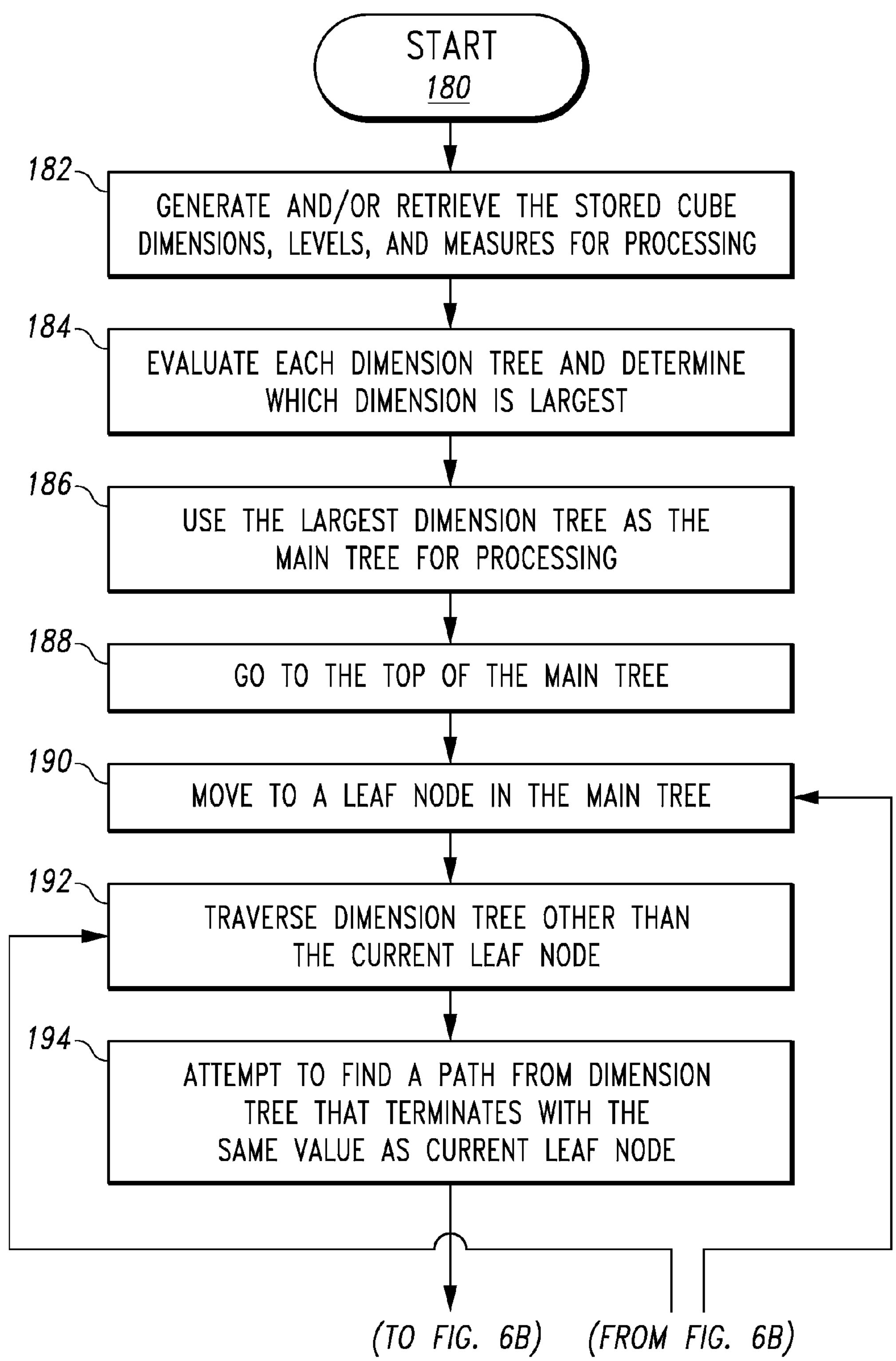
FIG. 6A is a first part process flow diagram for the system of FIG. 1 demonstrating the stages involved in transforming the cube into a recordset.
Figure 6B:
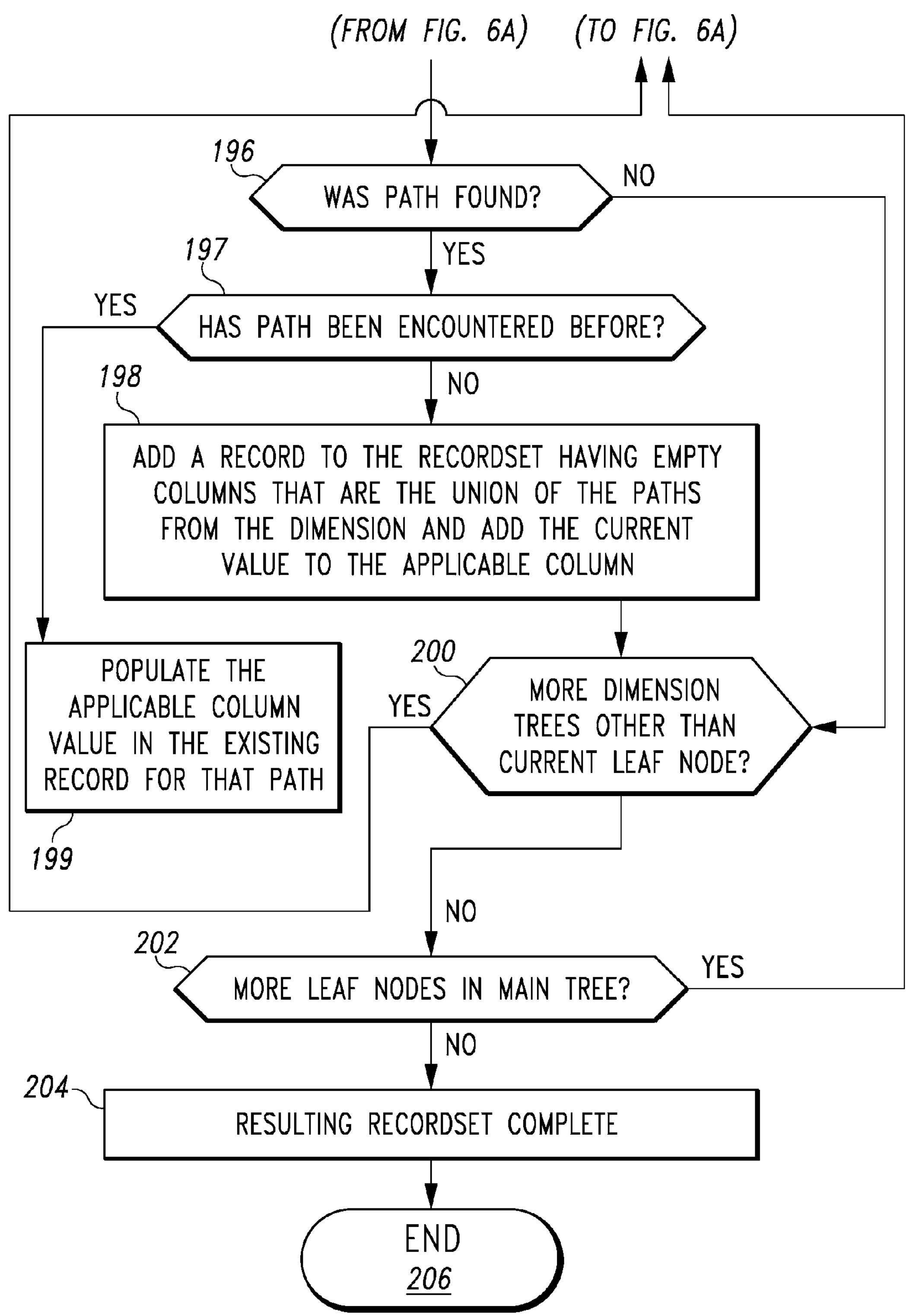
FIG. 6B is a second part process flow diagram for the system of FIG. 1 demonstrating the stages involved in transforming the cube into a recordset.

Turning now to FIGS. 6A-6B, procedure 180 demonstrates the detailed stages involved in transforming the cube into a recordset. In one form, procedure 180 is at least partially implemented in the operating logic of system 20. Procedure 180 begins in FIG. 6A with generating and/or retrieving the stored cube dimensions, levels, and measures for processing (stage 182), if applicable. Each dimension tree is evaluated to determine which one is largest (stage 184). The largest dimension tree is used as the main tree for processing (stage 186). From the top of the main tree (stage 188), a leaf node is accessed (stage 190) and becomes the current leaf node. A tree other than the current leaf node is traversed (stage 192) in an attempt to find an intersecting path that terminates with the same identifier as the current leaf node (stage 194). Several types of elements or combinations thereof could be used as an identifier. As one non-limiting example, the identifier can be based on the document position of the value in the underlying document object model (DOM). Continuing with FIG. 6B, if an intersecting path is found (decision point 196), then the system evaluates whether the particular path has been encountered before (decision point 197). If the path has not been encountered before (decision point 197), then the measures table is used as a lookup table to determine the column names and a record is added to the recordset with empty columns generated from the union of the paths from the dimension (stage 198). The current value is added to the applicable column of the record (stage 198). If the particular path has been encountered before (decision point 197), the measures table is used as a lookup table to determine which column of the existing record to place the value in and the column value is then populated in the identified column of the existing record for that path (stage 199).

If there are more dimension trees remaining to compare to the current leaf node (decision point 200), then another dimension tree is traversed other than the current leaf node (stage 192) to see if there is an intersecting path (stage 194) requiring another record to be added to the recordset (stage 198). Once all dimension trees have been compared to the current leaf node, then the system determines if there are more leaf nodes in the main tree (decision point 202). If there are more leaf nodes in the main tree (decision point 202), then the next leaf node becomes the current leaf node (stage 190). Again, as previously described, all dimension trees other than the current leaf node are traversed (stage 192) to see if there is an intersecting path (stage 194) requiring another record to be added to the recordset (stage 192). Once all leaf nodes in the main tree have been processed, the recordset is complete (stage 204). The procedure then ends at stage 206.

Figure 7:
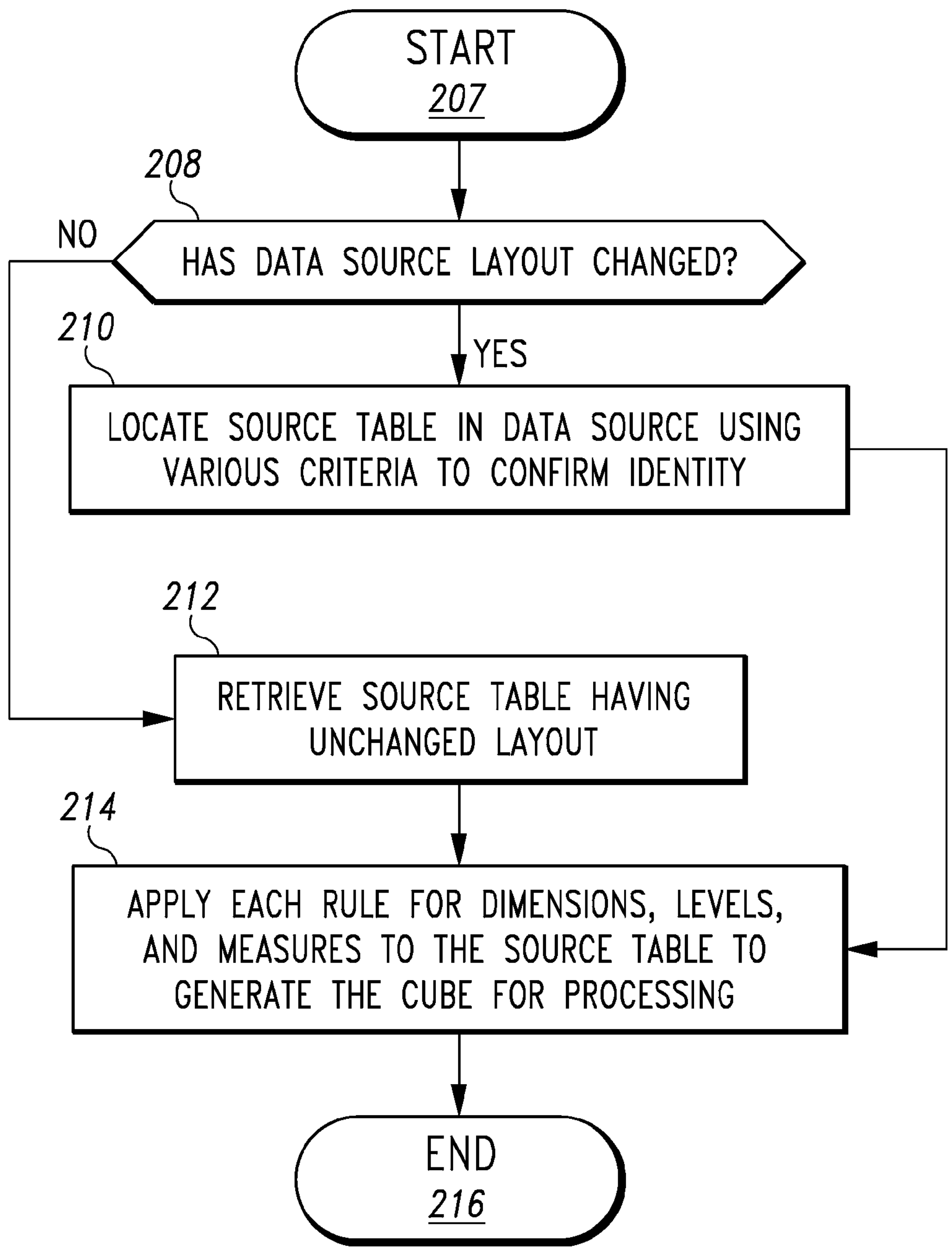
FIG. 7 is a process flow diagram for the system of FIG. 1 demonstrating the stages involved in building a cube using rules for a dynamic layout.

Turning now to FIG. 7, procedure 207 demonstrates the stages involved in generating a cube using rules for a dynamic layout (stage 182 of FIG. 6A). Procedure 207 is used when the adaptive table option has been specified as the selection mode of the dataset and the cube needs to be generated. In one form, procedure 207 is at least partially implemented in the operating logic of system 20. Procedure 207 begins with determining whether the data source layout has changed (decision point 208). If the data source layout has changed, then the source table in the data source is located from among multiple tables using various criteria to confirm the identity (stage 210). The system evaluates the parameters which were specified on the Dynamic Table Parameters screen to identify the correct table in the data source.

Various mathematical calculations are performed on each of the tables in the data source to identify the correct table. An illustration will now be provided as a non-limiting example of how the correct table can be identified. A top level calculation is evaluated and then individual elements are calculated, with each calculation producing a result which represents the "distance" between the two items being compared (i.e. two tables that each could possibly be the correct table). An example of the top level calculation is:

TableDistance=ColumnDist*ColumnDistFactor+ColumnCountDist*ColumnCountDistFactor+RowCountDist*RowCountDistFactor As illustrated and discussed later with respect to FIG. 24, an example ColumnDistFactor might be 0.6, ColumnCountDistFactor might be 0.2, and RowCountDistFactor might be 0.2. An example formula for calculating ColumnDist for each column header in the first and second tables is:

StringDist=1−(LevenshteinDistance(string1,string2)/MAX(Length(String1),Length(String2)))

After performing the above calculations, it is known to what degree each column header in the second table matches a given column header in the first table. This result alone may not be sufficient in all cases since the distance between the columns themselves in the table may need to be considered. For example, a very close match several columns away should not likely weigh as heavily as a slightly lesser match in the same column. To incorporate the distance between columns it is necessary to develop a weighting function that assigns a specific weight factor to each integer distance between columns. This can be accomplished with a table of discrete values or with a continuous function operating on the domain of nonnegative integers, as two non-limiting examples. One possible example employing an exponential weight function would be:

ColumnDist=StringDist*$e$^−(|ColumnPosition1−ColumnPosition2|*Factor)

In this example, Factor is used to modify the exponential curve to vary the weight applied for a given distance between columns.

The end result of these calculations is the identification of which of the multiple tables has a higher accuracy compared to the original and is thus the correct data source table to use. As stated previously, various other types of calculations can be used to locate the correct data source table when the layouts have changed, and these examples are provided for illustration purposes only.

If the data source layout has not changed (decision point 208), then the source table with the unchanged layout is retrieved (stage 212). Once the changed or unchanged data source table is identified, the rules for each dimension, level, and measure are applied to generate the cube for further processing (stage 214). The procedure then ends at stage 216. These procedures for working with dynamic data sources are illustrated in more detail in FIGS. 24-28.

Figure 8:
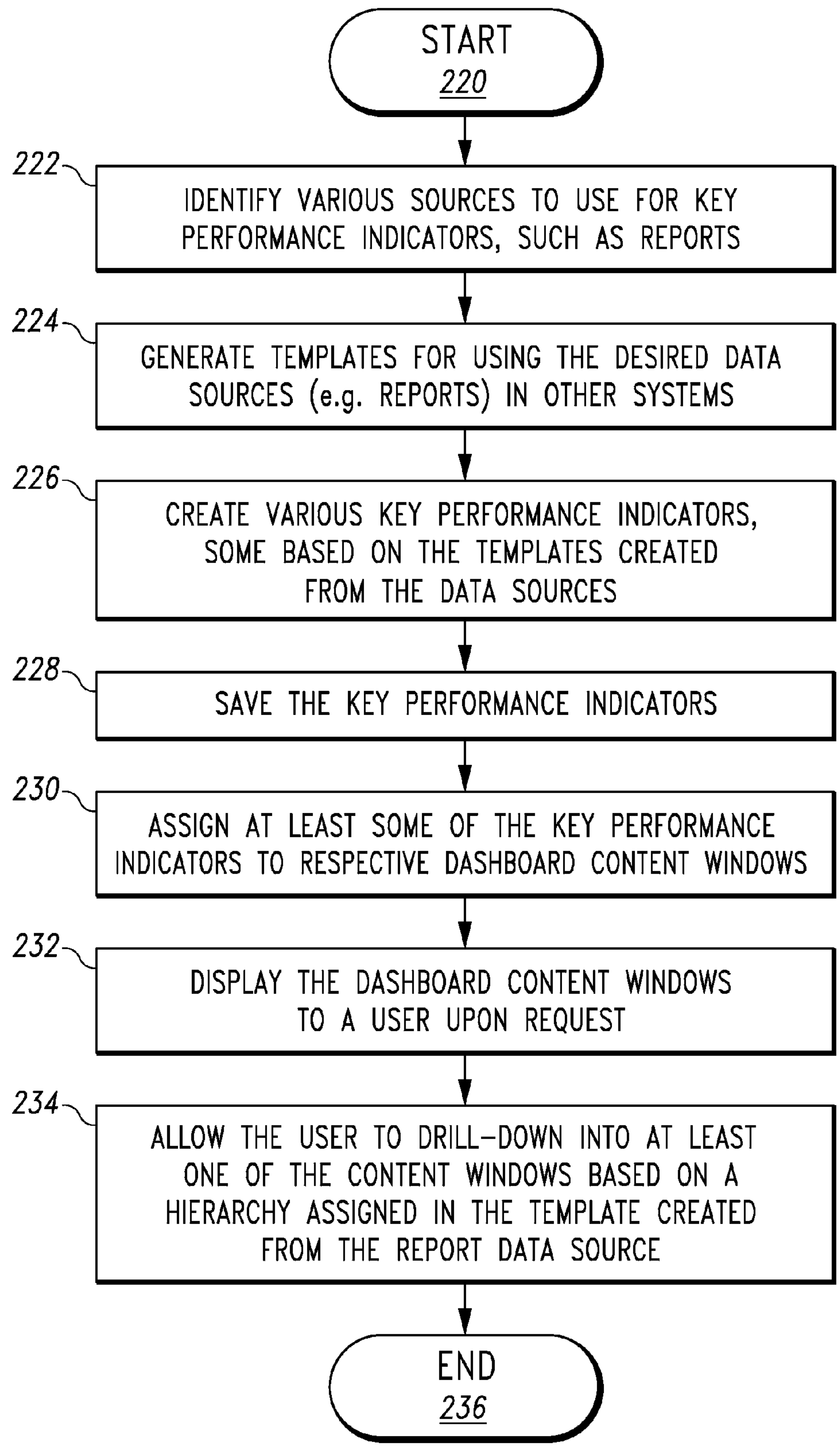
FIG. 8 is a process flow diagram for the system of FIG. 1 demonstrating the stages involved using the transformed data in a dashboard application.

Turning now to FIG. 8, procedure 220 demonstrates the stages involved in using the transformed data in a dashboard application. In one form, procedure 220 is at least partially implemented in the operating logic of system 20. Procedure 220 begins with identifying various sources, such as reports, to use for key performance indicators (stage 222). Templates are generated that allow the desired data sources (e.g. reports) to be used in other applications (stage 224). Various key performance indicators are created, some of which are based on the templates created from the report data sources (stage 226). The key performance indicators are saved (stage 228) and at least some of the key performance indicators are assigned to respective dashboard content windows (stage 230). The dashboard content windows are displayed to a user upon request (stage 232). The user can drill-down into at least one of the content windows based on a hierarchy assigned in the template created from the data source (stage 234). The procedure then ends at stage 236.

Figure 10:
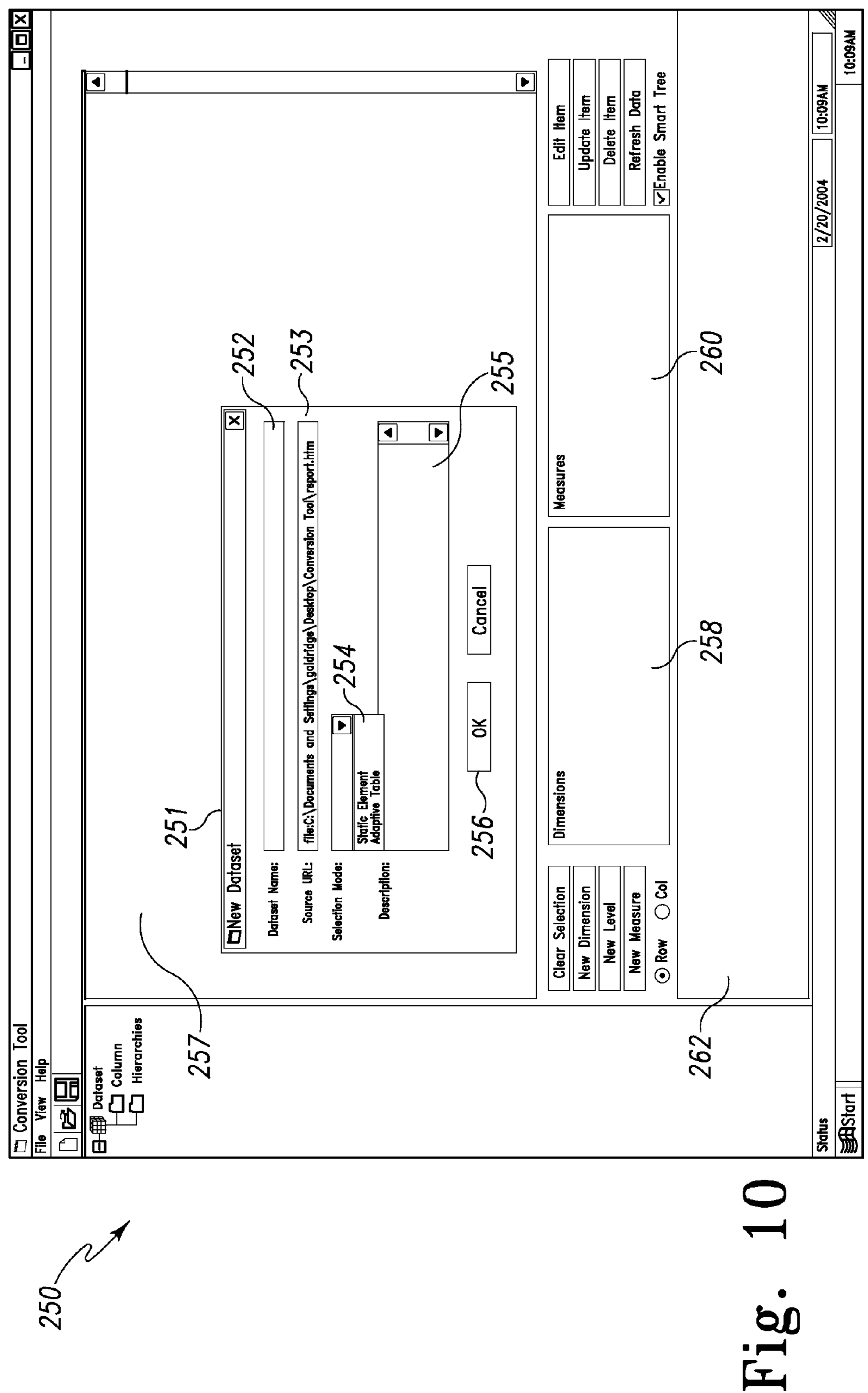
FIG. 10 is a simulated screen of a conversion tool user interface for one or more client workstations of FIG. 1 that illustrates specifying a data source, as described in the procedure of FIG. 3A.

A hypothetical example will now be described in FIGS. 9-31 to illustrate the procedures of FIGS. 3-8. FIG. 9 is a sample HTML report having content 240 that is used as a data source for the hypothetical illustration. Turning now to FIG. 10, a simulated screen of a conversion tool user interface 250 is shown. After selecting an option to create a new recordset/dataset (stage 122), dialog box 251 is displayed. The settings specified by the user in the mapping tool during this process generate the template that allows the data to be transformed for use in other systems. The user can specify a dataset name 252, a URL/path to the source document 253, a selection mode option 254 (stage 124), and a description 255, and can select an OK option 256 to load the data source document into the document window 257. The selection mode option 254 is allows the user to specify whether the data source is static or adaptive/dynamic, and the option specified determines whether the cube will be generated based on static mappings or based on rules. Dimensions and measures are added to the dimensions area 258 and measures area 260, respectively. A data pane 262 will later display the resulting recordset for testing the mapping.

Figure 11:
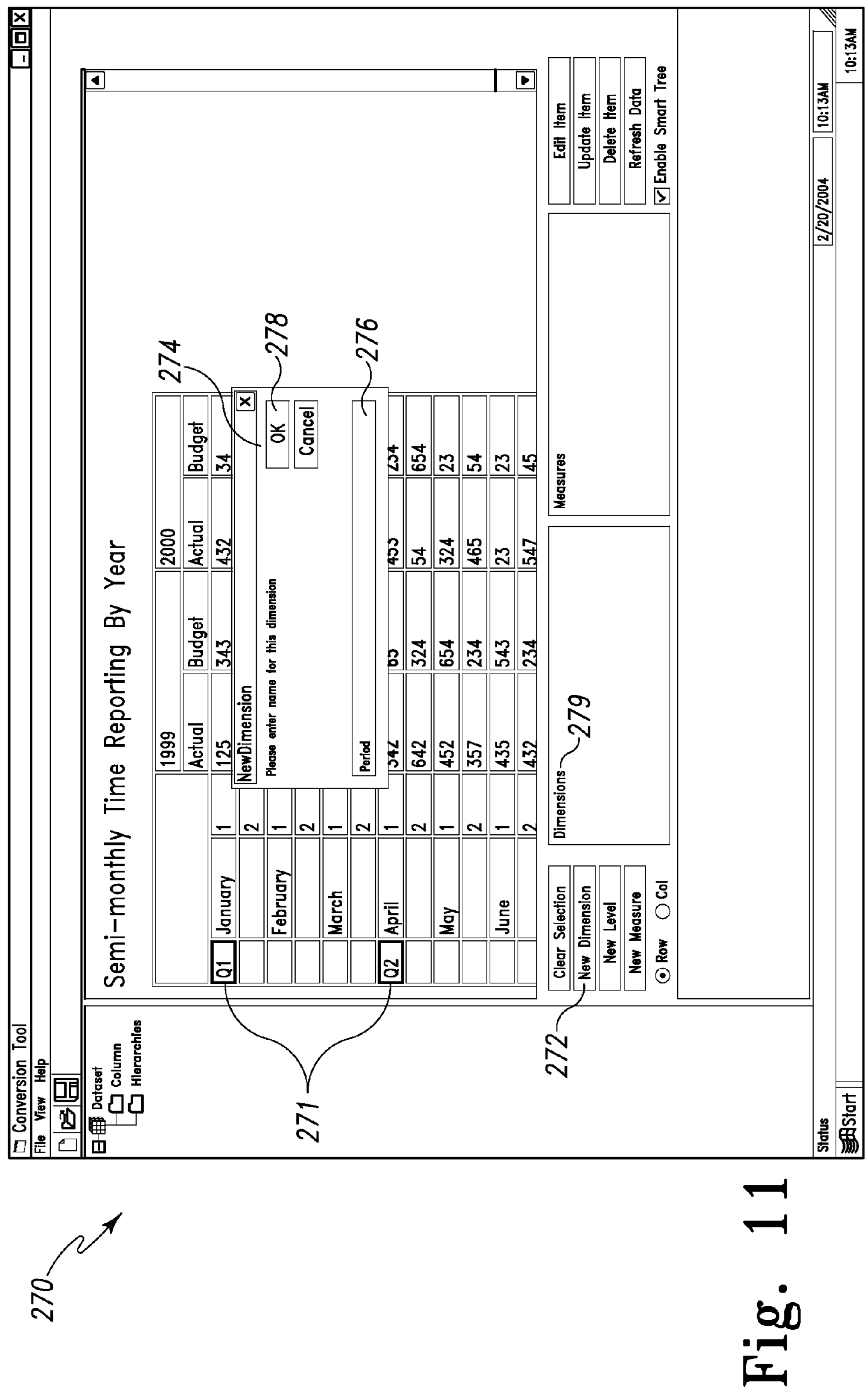
FIG. 11 is a simulated screen of a conversion tool user interface for one or more client workstations of FIG. 1 that illustrates adding a dimension, as described in the procedure of FIG. 3A.
Figure 12:
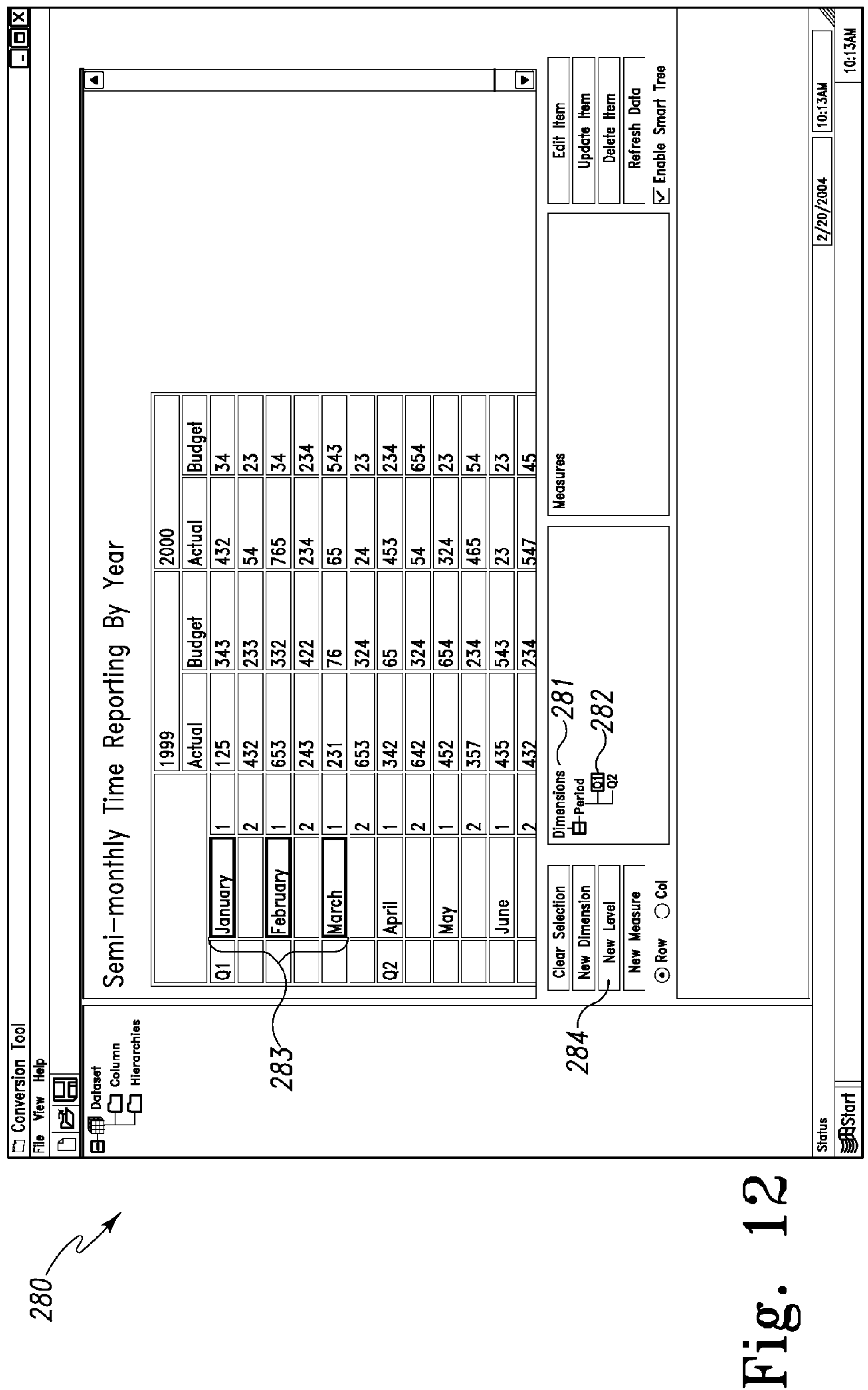
FIG. 12 is a simulated screen of a conversion tool user interface for one or more client workstations of FIG. 1 that illustrates adding a level, as described in the procedure of FIG. 3A.
Figure 13:
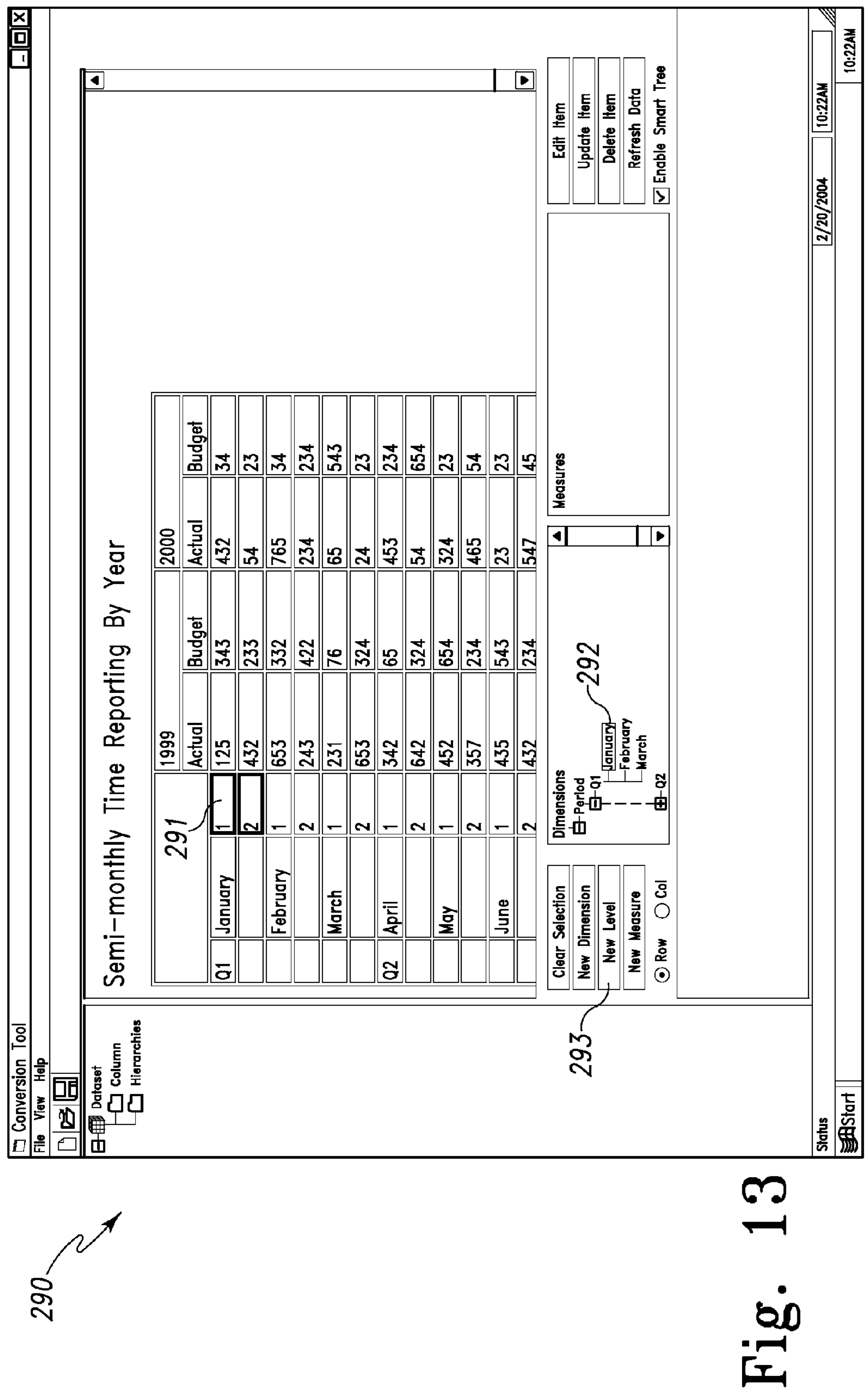
FIG. 13 is a simulated screen of a conversion tool user interface for one or more client workstations of FIG. 1 that illustrates adding a level to an existing level, as described in the procedure of FIG. 3A.
Figure 14:
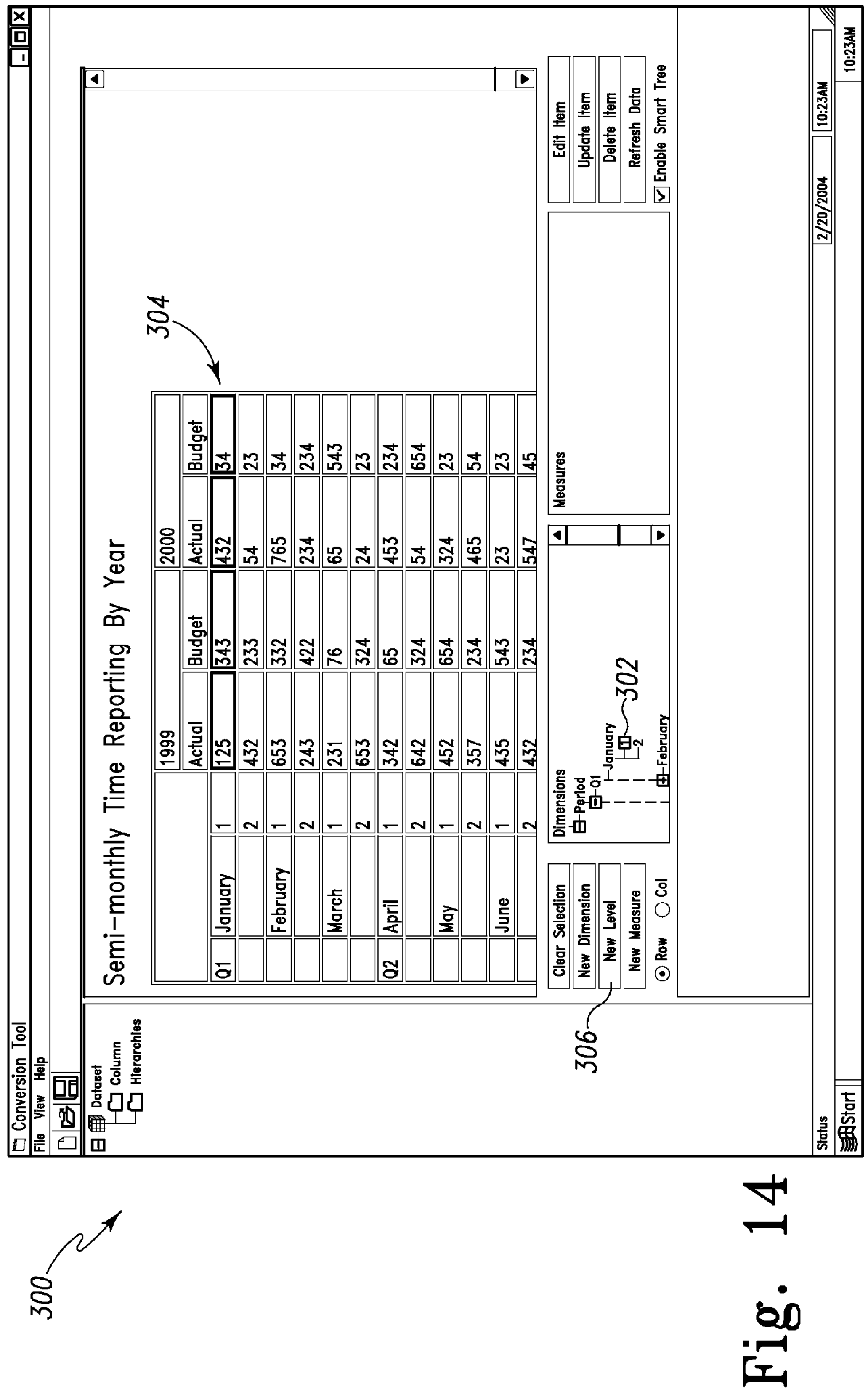
FIG. 14 is a simulated screen of a conversion tool user interface for one or more client workstations of FIG. 1 that illustrates adding values to a particular lowest level, as described in the procedure of FIG. 3A.
Figure 15:
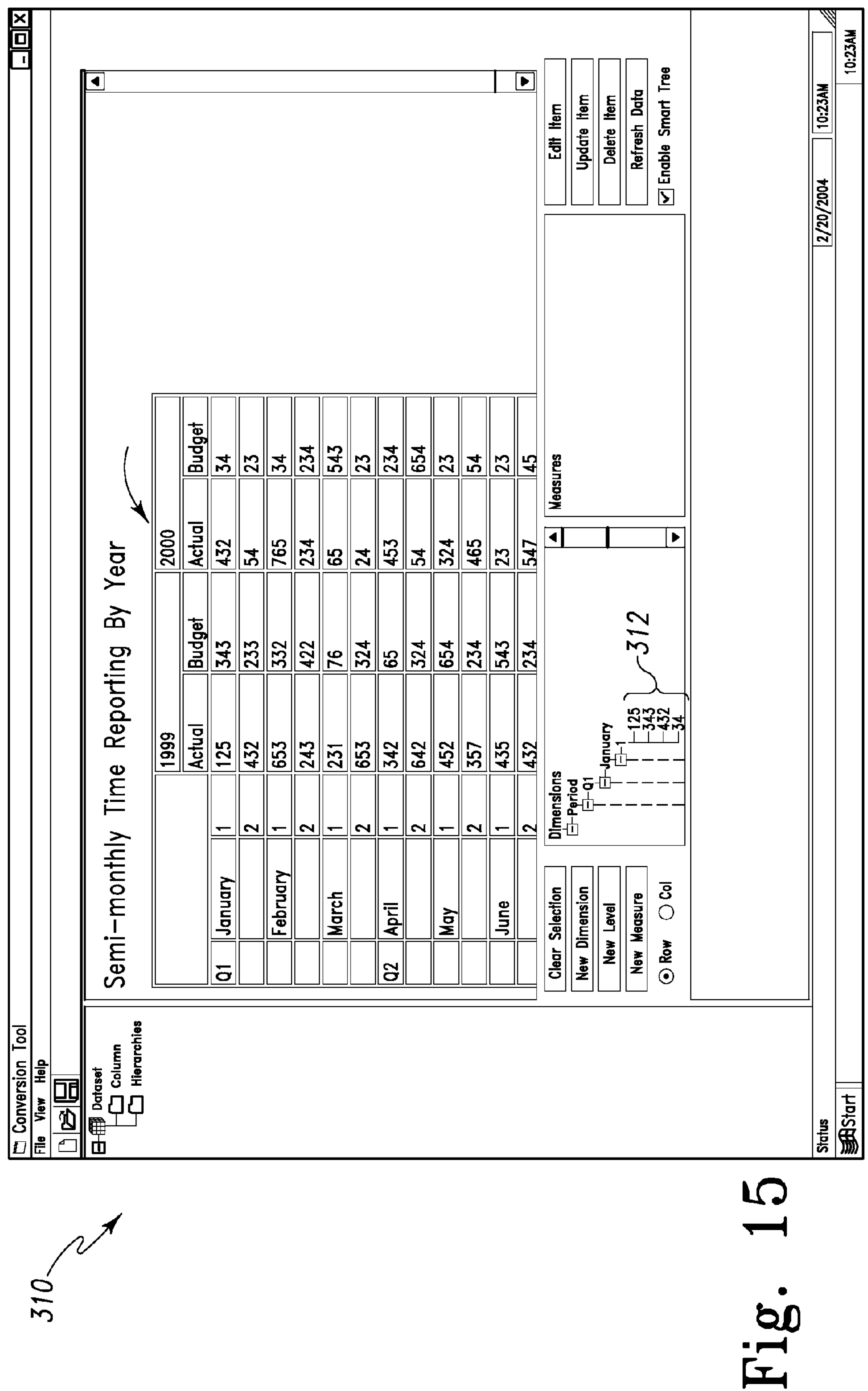
FIG. 15 is a simulated screen of a conversion tool user interface for one or more client workstations of FIG. 1 illustrating that the previously selected values were added to the particular lowest level, as described in the procedure of FIG. 3A.

FIGS. 11-23 illustrate the stages involved in mapping a static data source to dimensions, levels, and measures, and then generating a recordset as described in the procedures of FIGS. 3A-3B. FIGS. 24-28 illustrate how the stages differ when the adaptive/dynamic option has been selected, as described in the procedures of FIGS. 4A-4B. Turning now to the illustration of the static mapping process, assume that the selection mode option has been set to "static element". FIG. 11 is a simulated screen 270 that demonstrates adding a new dimension (stage 126). The user first selects level values 271 for the first dimension, and then selects the new dimension option 272. A dialog box 274 is displayed where the user enters the dimension name, which in this case is Period 276. After selecting the OK option 278, the dimension Period (stage 126) and the first levels Q1 and Q2 (stage 127) are added to the dimensions node 279. FIG. 12 shows the dimensions node 281 with the new Period levels added. The user selects the Q1 level 282, and selects the month levels 283 to be associated with the Q1 level. Upon selecting the New Level option 284, the month levels 283 are added (stage 127) as children of the Q1 level 282. As shown in FIG. 13, the simulated screen 290 illustrates adding another level to the month level. Semi-monthly levels 291 are selected, and the month levels 292 in the dimensions node that they should be associated with are also selected. The user then selects the New Level option 293 to add the new semi-monthly levels (stage 127) under the January level 292. As shown in FIG. 14, the simulated screen 300 illustrates adding values 304 to the semi-monthly level 1 (302). After selecting the values 304 and associated level 302, the user selects the New Level option 306 to add the values 304 as children to level 302 (stage 130). The simulated screen 310 of FIG. 15 illustrates how the values 312 that were just added appear in the dimensions tree. These steps repeat until the level values are all added for the Period dimension.

Figure 16:
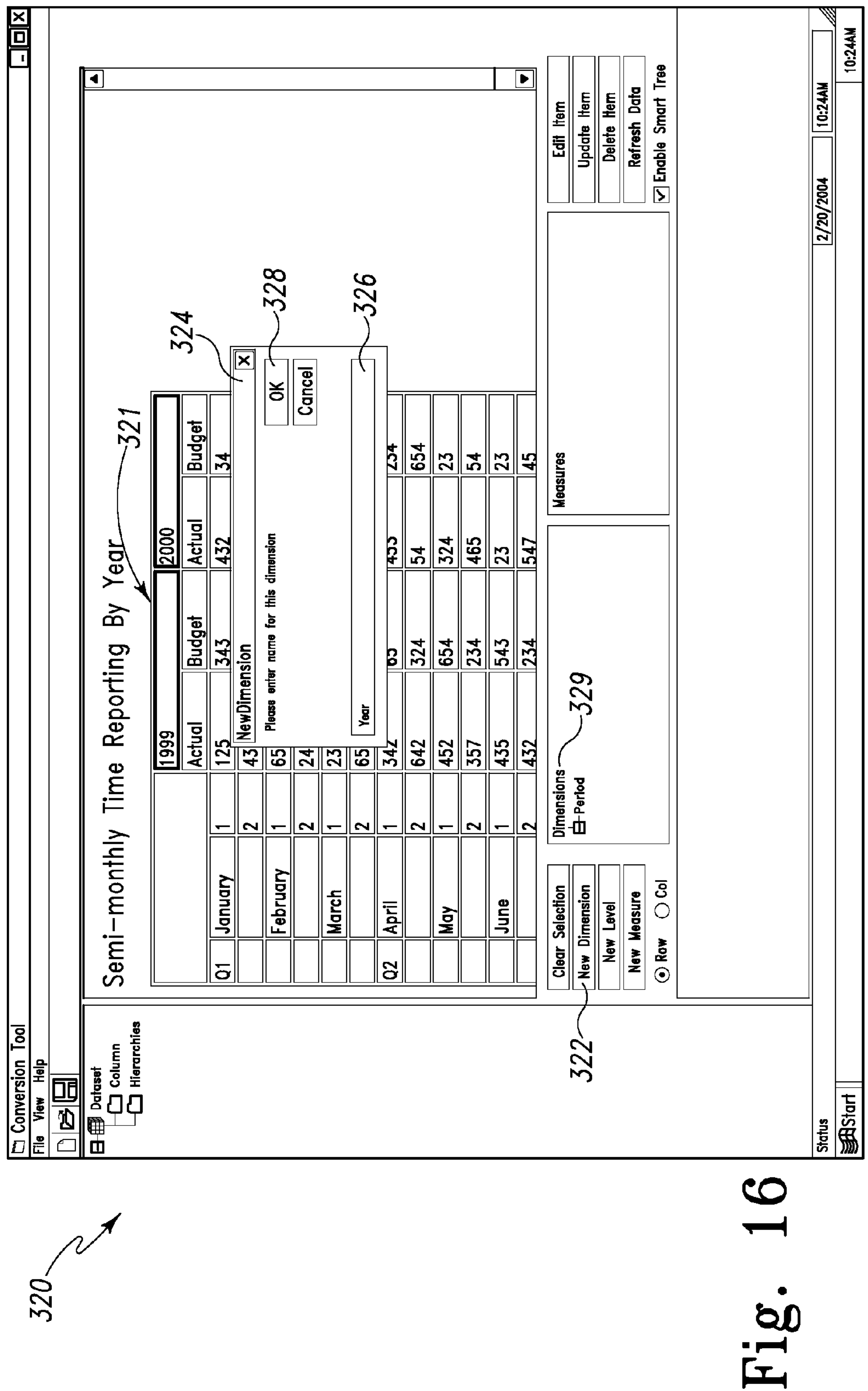
FIG. 16 is a simulated screen of a conversion tool user interface for one or more client workstations of FIG. 1 illustrating adding another dimension, as described in the procedure of FIG. 3A.
Figure 17:
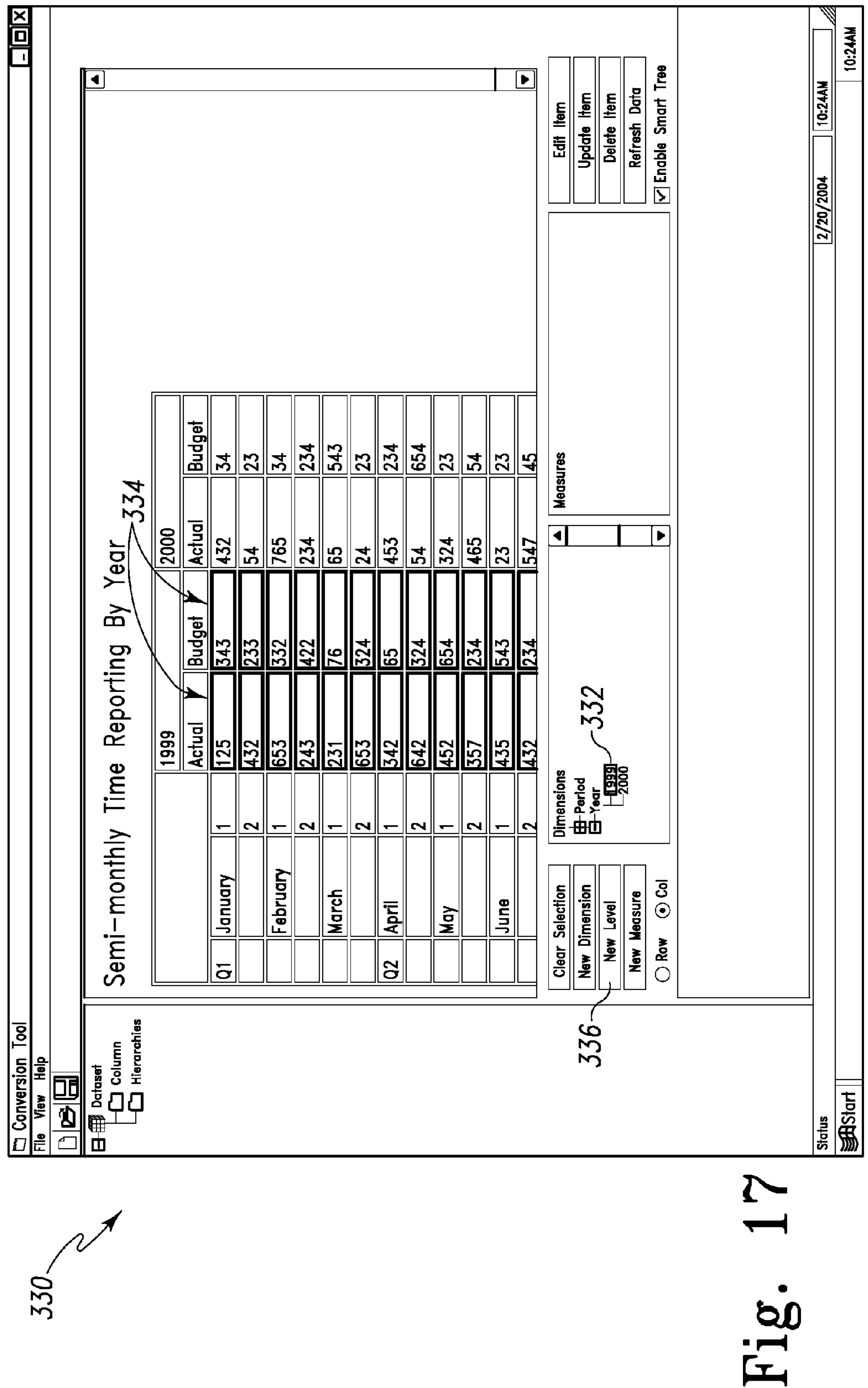
FIG. 17 is a simulated screen of a conversion tool user interface for one or more client workstations of FIG. 1 illustrating adding values to another lowest level, as described in the procedure of FIG. 3A.
Figure 18:
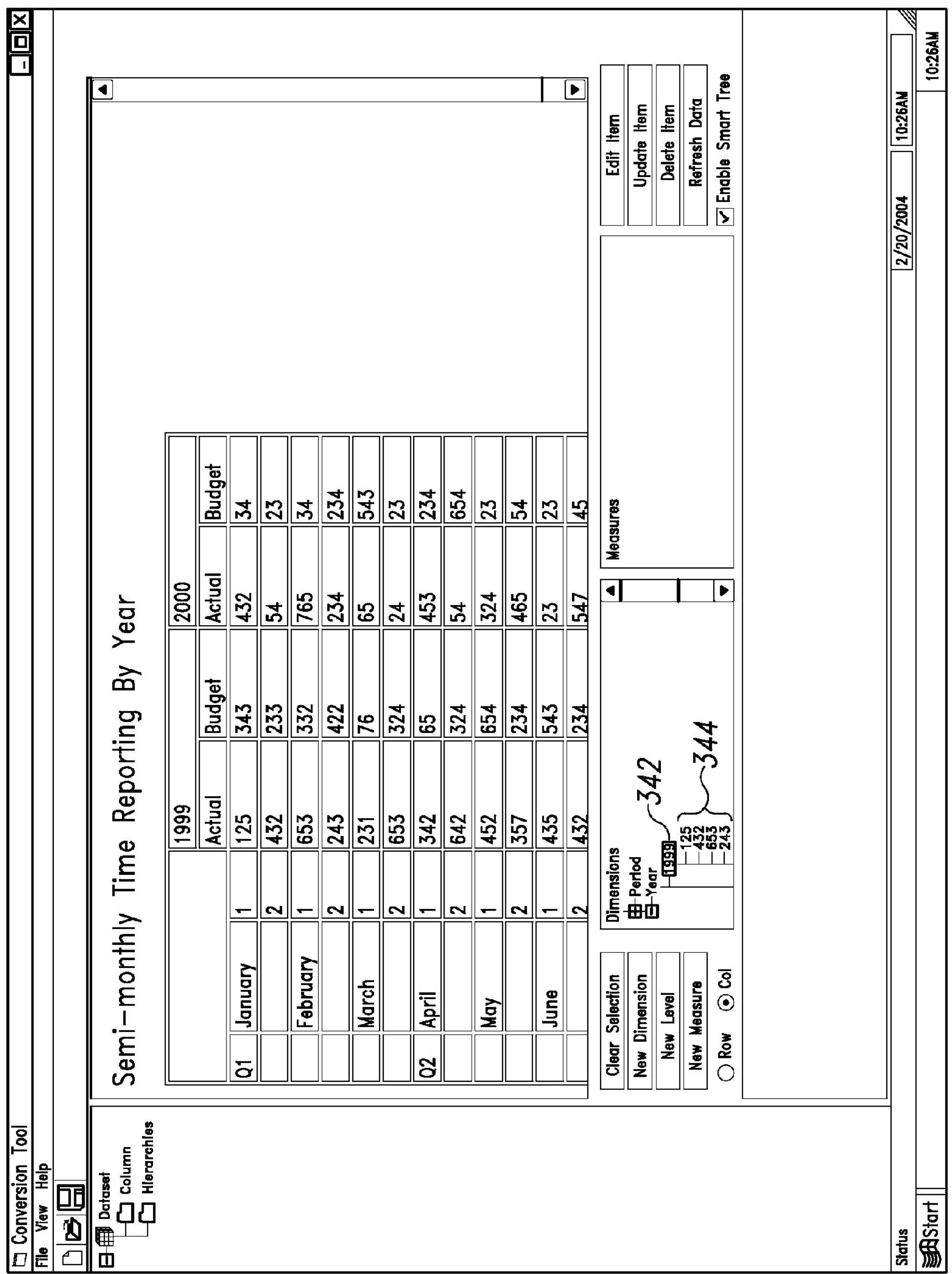
FIG. 18 is a simulated screen of a conversion tool user interface for one or more client workstations of FIG. 1 illustrating that the previously selected values were added to the particular lowest level, as described in the procedure of FIG. 3A.
Figure 19:
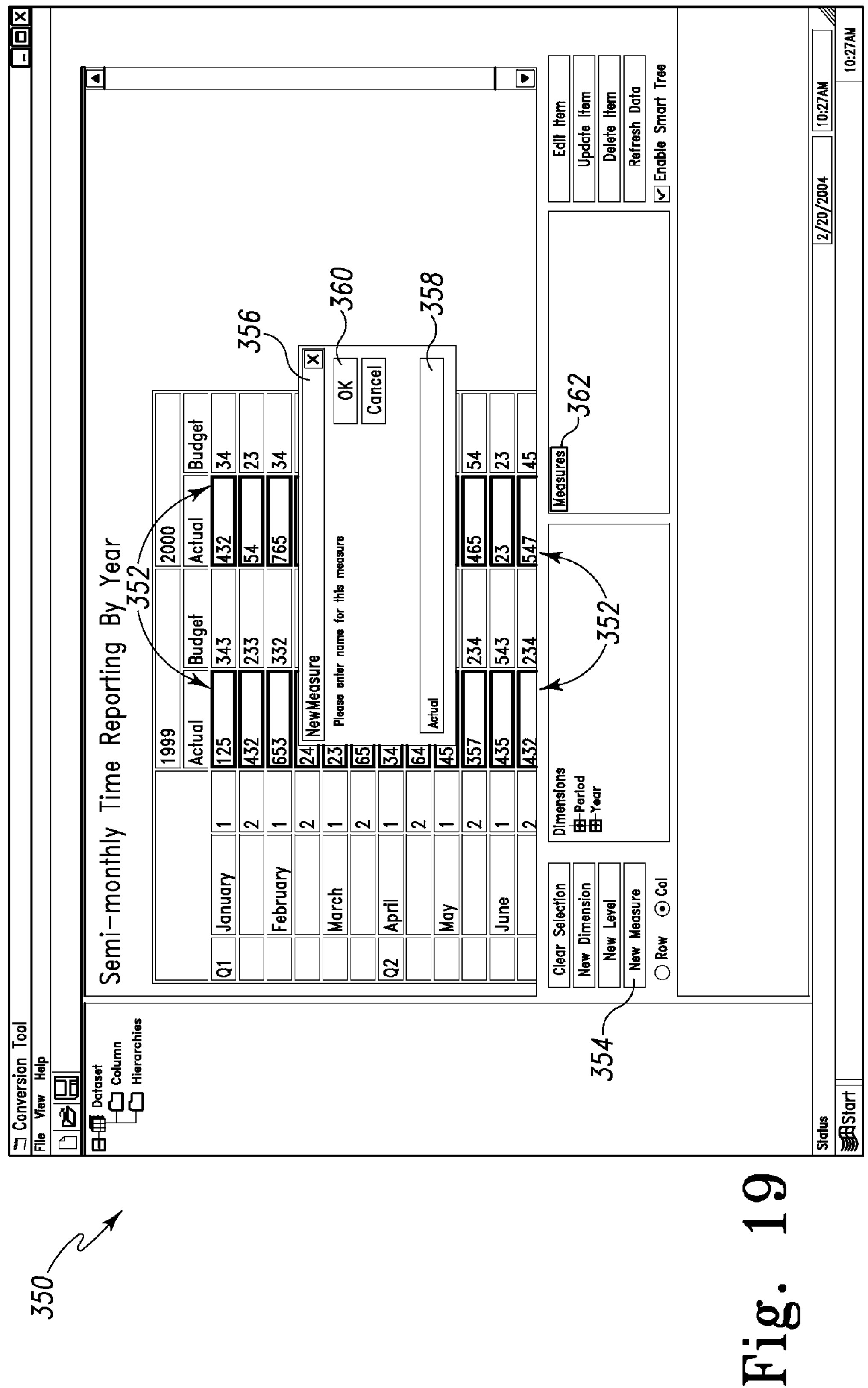
FIG. 19 is a simulated screen of a conversion tool user interface for one or more client workstations of FIG. 1 illustrating adding a new measure and values for the measure, as described in the procedure of FIG. 3B.

Turning now to FIG. 16, the simulated screen 320 illustrates adding another dimension. The user selects the year levels 321 to add to a new dimension, and selects the New Dimension option 322 (stage 126). Dialog box 324 is displayed and the user inputs the name 326 for the new dimension, which in this case is Year. After selecting the OK option 328, the Year dimension will be added to the dimension tree (stage 126) with levels "1999" and "2000" (stage 127). As shown in FIG. 17, the simulated screen 330 illustrates adding a new level to the "1999" year level 332. The user selects the "1999" level 332 and the corresponding values 334 to associate with the "1999" level 332. The user then selects the New Level option 336 and the values 334 are added to the dimensions node (stage 130). The simulated screen 340 of FIG. 18 illustrates how the values that were just added 344 appear as children to the "1999" level 342. These steps repeat until the level values are all added for the Year dimension.

The measures are also added to complete the mapping of the multi-dimensional cube. Measures can be added before or after the dimensions. The order the measures and dimensions are added is not important as long as the end result contains the desired mappings. As shown in the simulated screen 350 of FIG. 19, the user selects the values for the "actual" measures 352 for adding to the measures 362 tree. Next, the New Measure option 354 is selected (stage 134), and a dialog box 356 is displayed. The user enters a name for the new measure 358, which in this case is Actual. After selecting the OK option 360, the values 352 for the new measure are added (stage 136) to the measures tree 362. These steps are repeated to add the Budget measure values to the measures tree 362. At this point, the cube dimensions, levels, and measures can be stored in memory or other storage to allow access to them during the further processing steps (stage 140).

Figure 20:
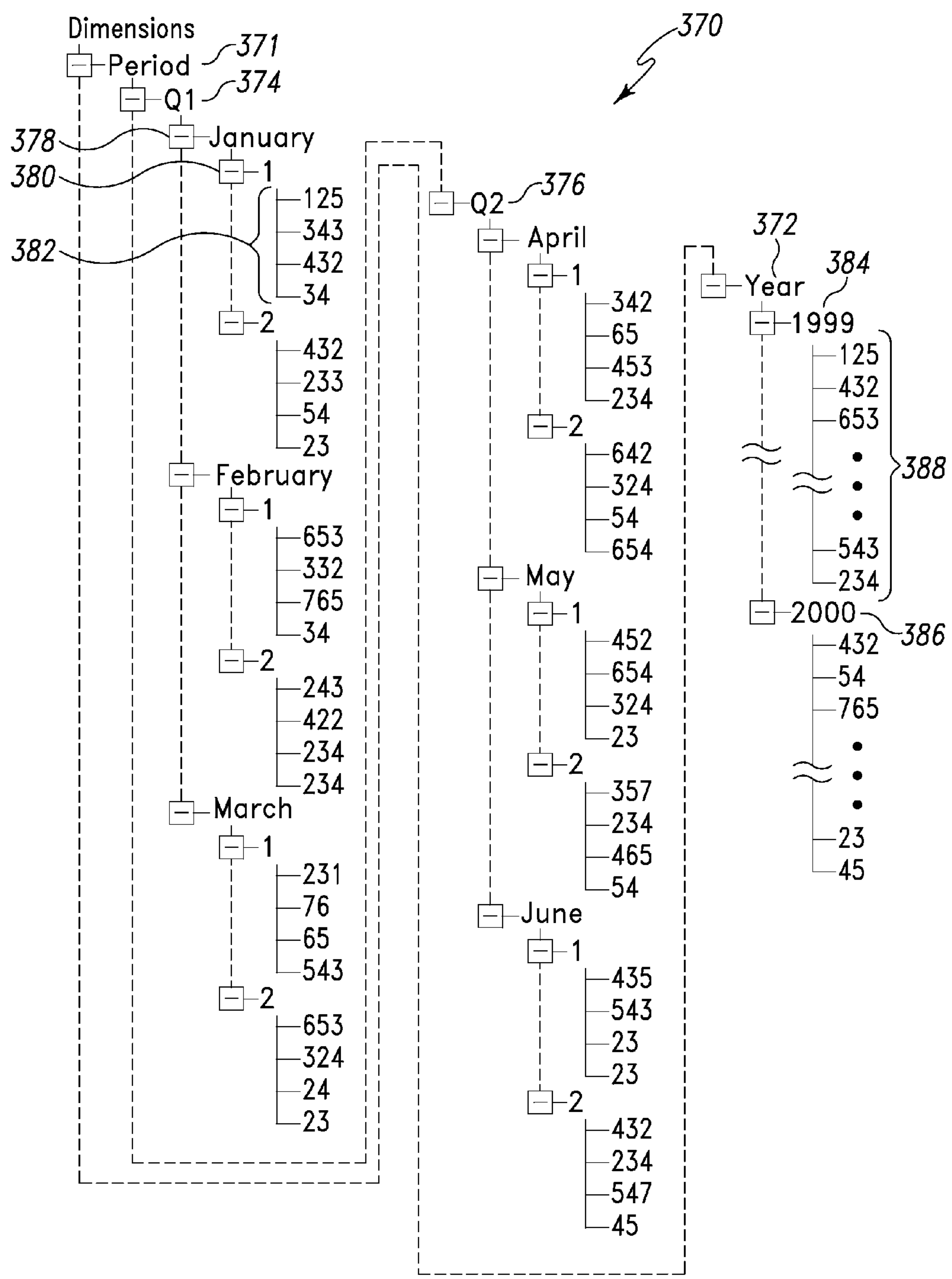
FIG. 20 is a treeview diagram illustrating the resulting hierarchy from mapping the sample HTML report of FIG. 9 into multiple dimensions and levels, as shown in FIGS. 10-18.
Figure 21:
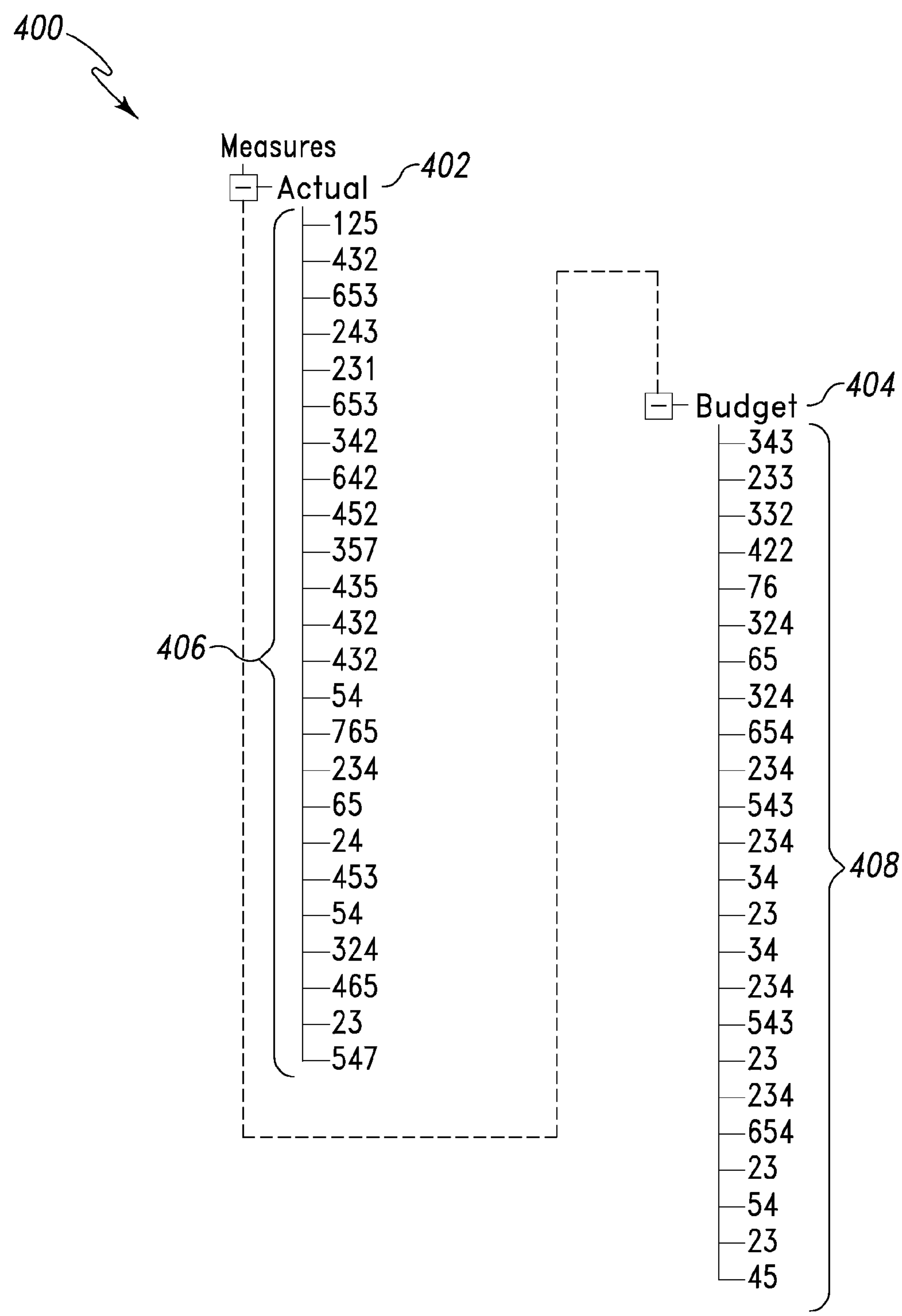
FIG. 21 is a treeview diagram illustrating the resulting hierarchy from mapping the sample HTML report of FIG. 9 into multiple measures, as shown in FIG. 19.

Turning now to FIG. 20, a treeview diagram illustrates the resulting hierarchy from mapping the sample HTML report of FIG. 9 into multiple dimensions and levels, as shown in the simulated screens of FIGS. 8-16. For example, the dimensions node contains two dimensions: Period 371 and Year 372. The Period 371 dimension contains multiple levels for month (e.g. 378), semi-month (e.g. 380), and the final values for each semi-month (e.g. 382). The Year dimension 372 contains two levels for year (e.g. 384 and 386), and the final values (e.g. 388) for each year level. As shown in FIG. 21, a treeview diagram illustrates the resulting hierarchy from mapping the sample HTML report of FIG. 9 into multiple measures, as shown in the simulated screen of FIG. 19. The measures node contains two measures: Actual 402 and Budget 404. Each measure contains values (e.g. 406 and 408). At this point, the mapping steps are complete.

Figure 22:
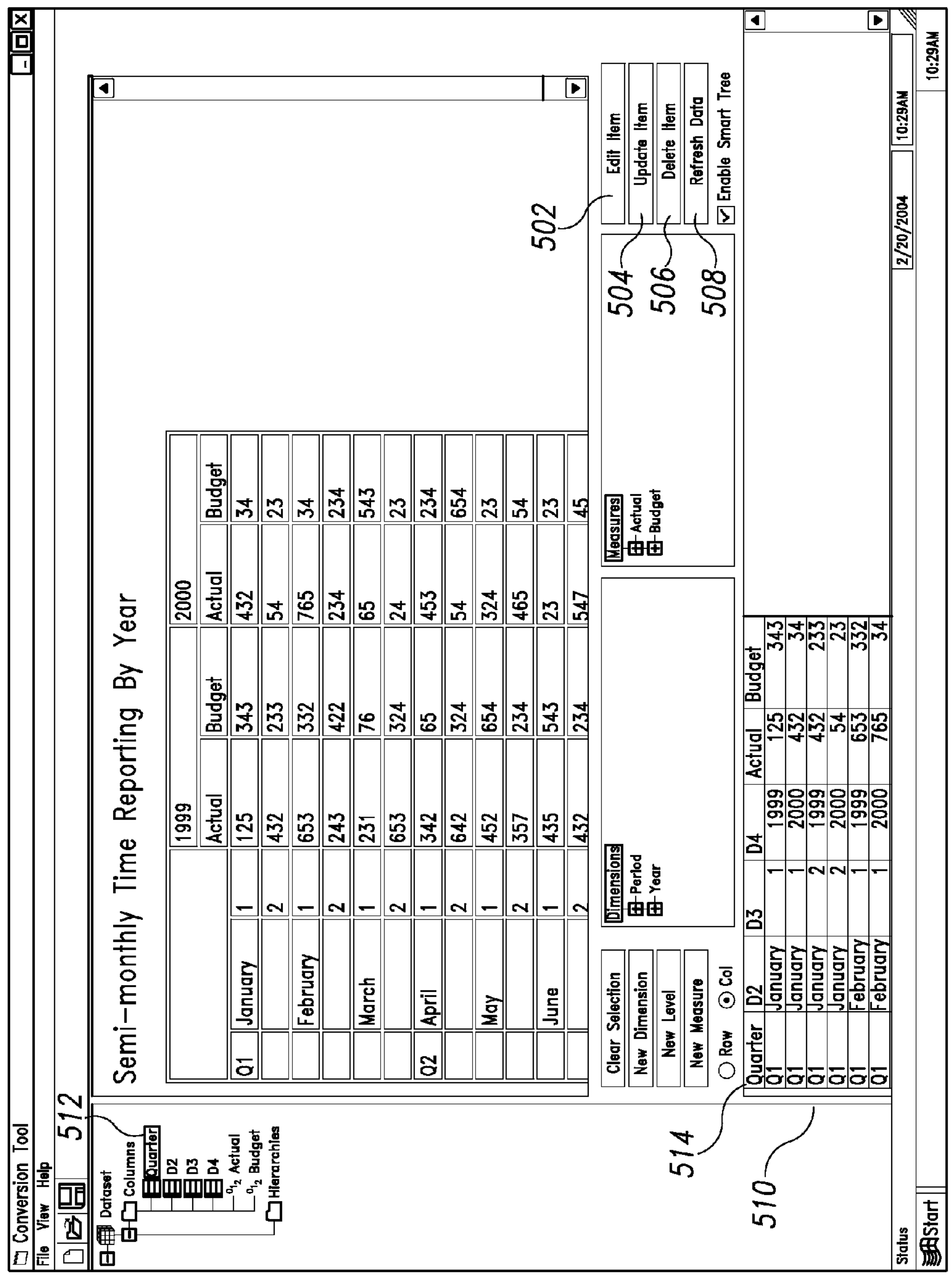
FIG. 22 is a simulated screen of a conversion tool user interface for one or more client workstations of FIG. 1 illustrating building the test recordset, as described in the procedures of FIGS. 5-6.

Turning now to FIG. 22, a simulated screen 500 illustrates building the test recordset, as described in the procedures of FIGS. 4-5. Before building the test recordset, the user can select various options, such as Edit Item 502, Update Item 504, and Delete Item 506. These options allow the user to modify the dimensions and measures previously added. When the user is ready to build the recordset to test to see if the mapping works as desired, he selects the Refresh Data option 508. The system then generates the recordset by traversing the nodes to determine where there are intersections (FIG. 5, stages 162-168; FIG. 5, stages 182-204), and displays the resulting dataset in the data display pane 510. The user can modify the column headings as desired, such as by renaming D1 to Quarter 512. The revised column heading for Quarter 514 is then displayed in the data pane 510 either automatically or the next time the Refresh Data option 508 is selected.

Figure 23:
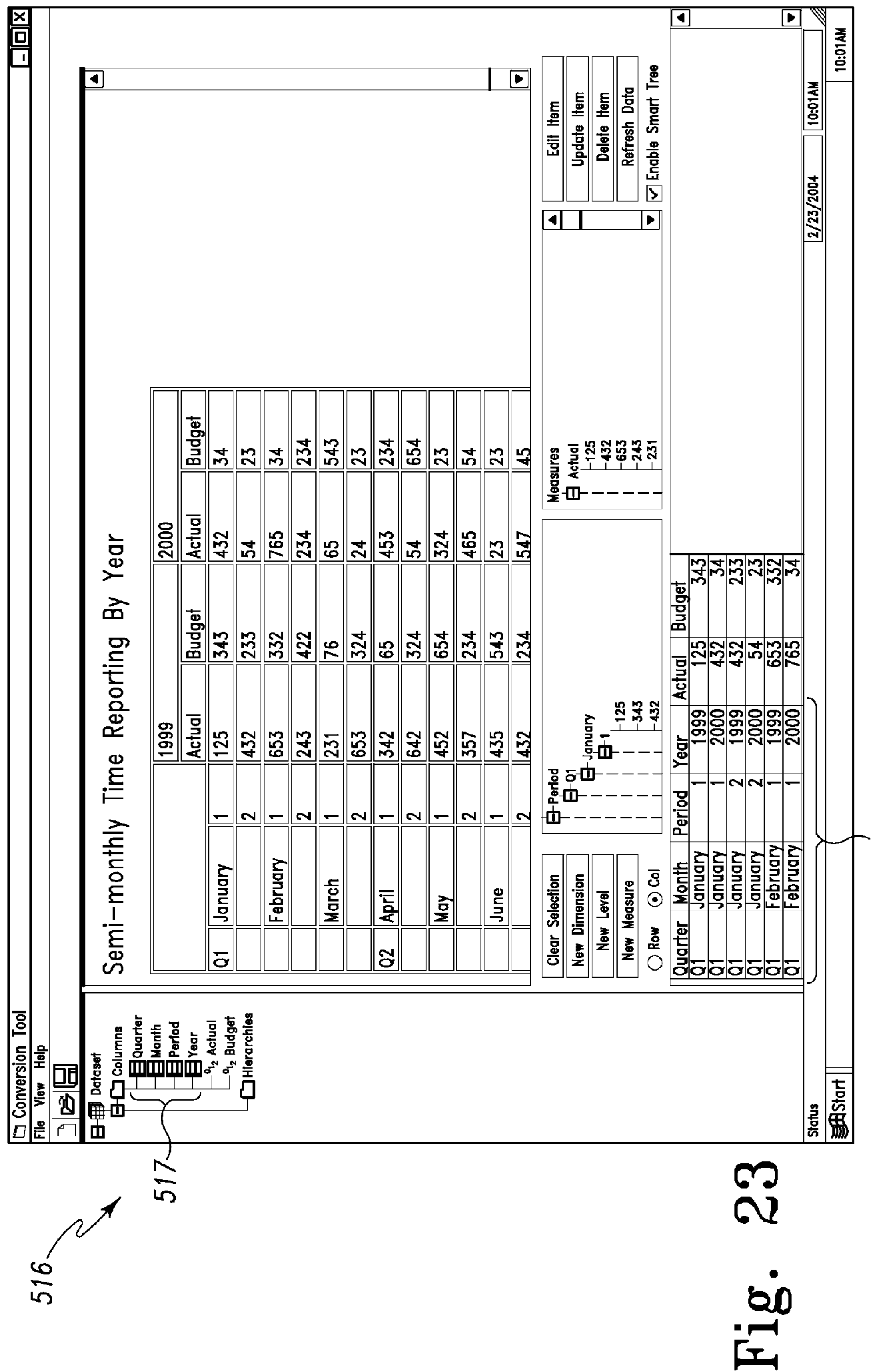
FIG. 23 is a simulated screen of a conversion tool user interface for one or more client workstations of FIG. 1 illustrating customizing the data columns of the template, as described in the procedure of FIG. 5.

As shown in FIG. 23, simulated screen 516 illustrates how the user customizes all of the data columns 517 of the mapping template, as described in the procedures of FIG. 5 (stage 170). The column headings 518 are then updated accordingly in the data pane.

Figure 24:
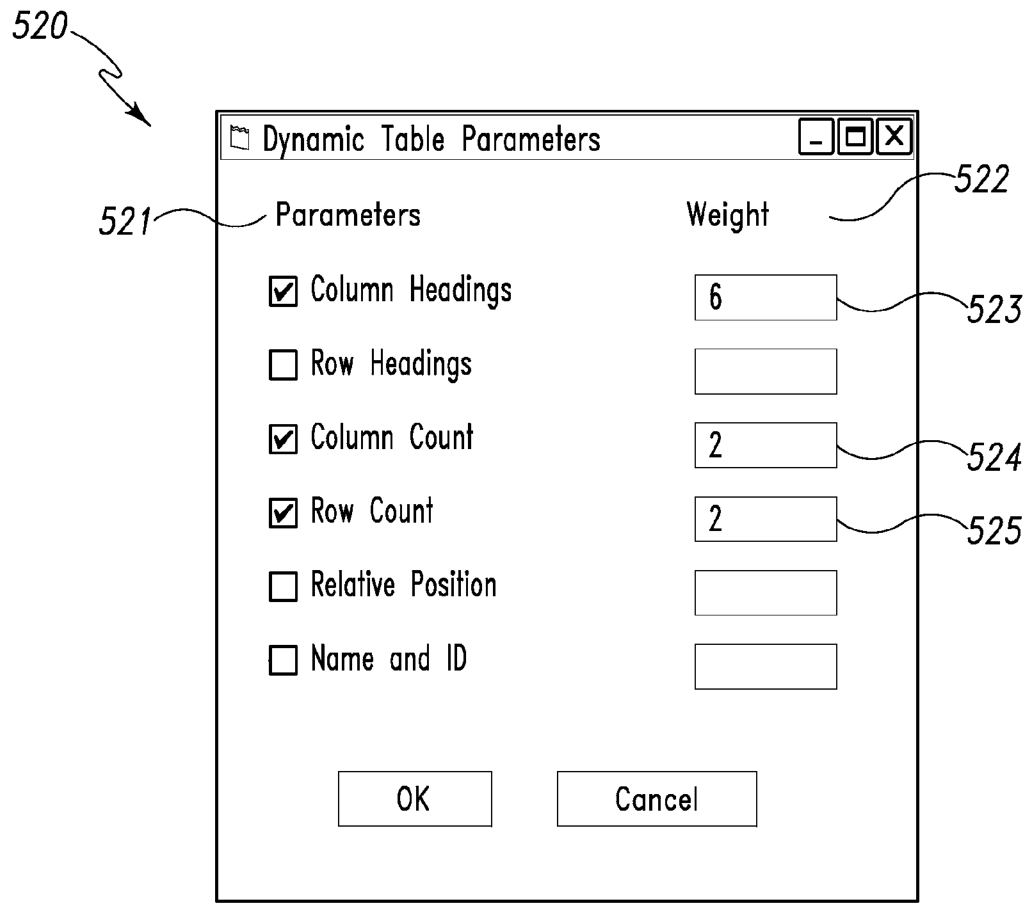
FIG. 24 is a simulated screen of a conversion tool user interface for one or more client workstations of FIG. 1 that illustrates setting dynamic table properties, as described in the procedure of FIGS. 4A-4B.

FIGS. 24-28 illustrate how the stages of mapping a data source to a multi-dimensional cube differ when the adaptive/dynamic option has been selected, as described in the procedures of FIGS. 4A-4B. The same data source from FIG. 9 is also be used with this example. Shown in FIG. 24 is a simulated screen 520 that appears after the user has specified a data source and set the selection mode to "adaptive table" mode (stage 146). The user uses screen 520 to set the dynamic table parameters (stage 147), with parameters 521 listed on the left and corresponding weights 522 listed on the right. These parameters are later used by the system to identify a data source table after it has been modified. In the current example, the column headings 523 have been given a weight of 0.6, column count 524 have been given a weight of 0.2, and the row count 525 have been given a weight of 0.2. This means that the column headings of the data source will be given more weight (emphasis) in identifying the correct data source table than the column count and row count, which will also be used to help with the identification. In other words, these values are weighted accordingly to evaluate the data source that has been modified and locate the correct table to be used. Various other methods can be used to correctly identify the data source table after it has been modified. These are non-limiting examples provided for illustration purposes only.

Figure 25:
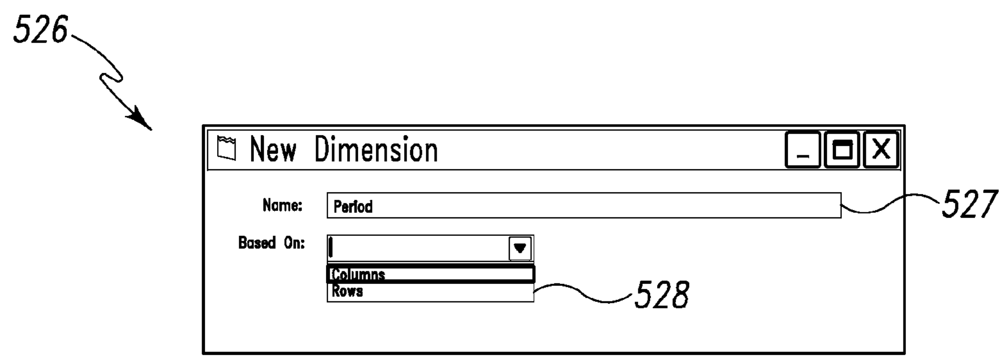
FIG. 25 is a simulated screen of a conversion tool user interface for one or more client workstations of FIG. 1 that illustrates adding a new dimension based on columns or rows, as described in the procedure of FIGS. 4A-4B.
Figure 27:
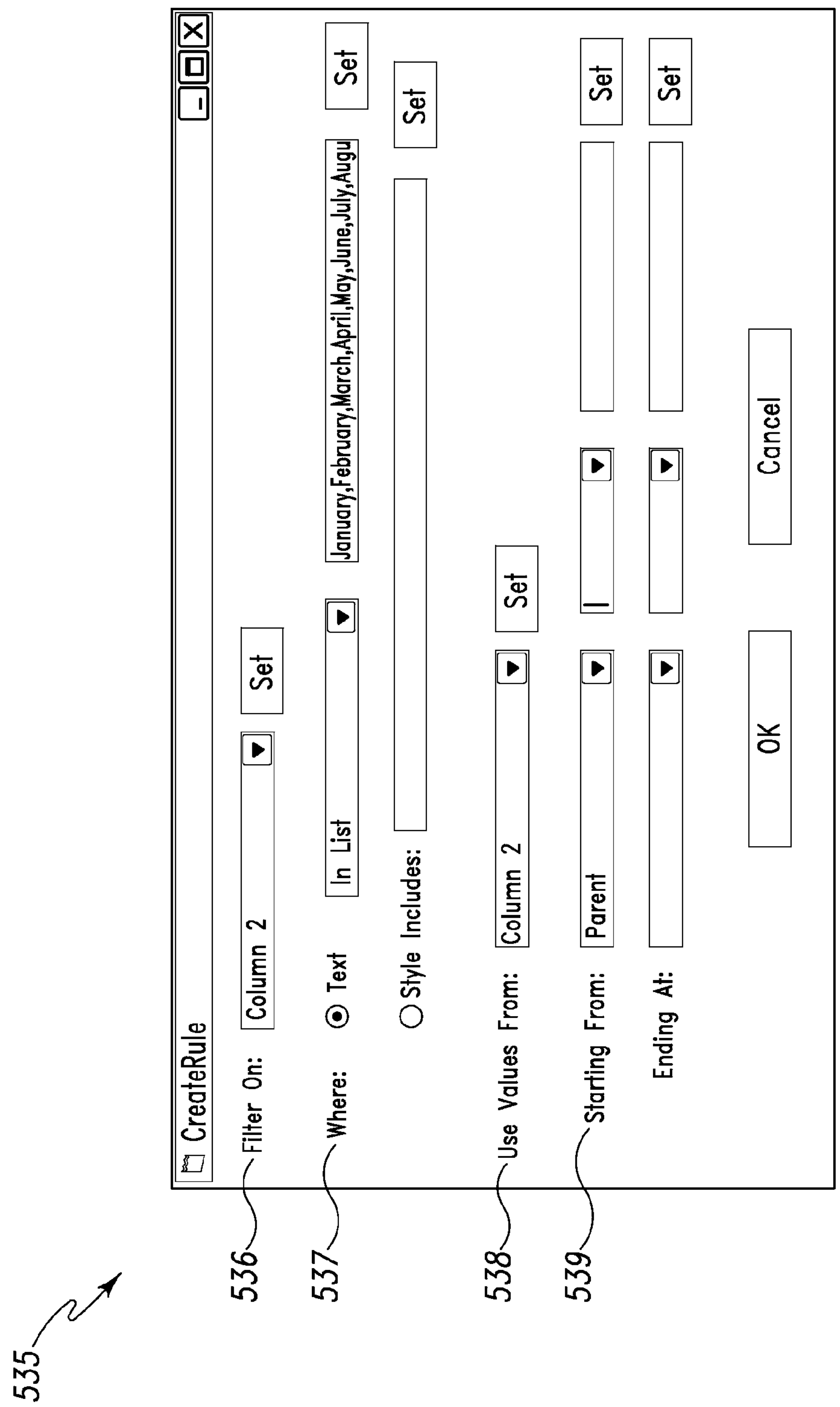
FIG. 27 is a simulated screen of a conversion tool user interface for one or more client workstations of FIG. 1 that illustrates adding another level based on rules, as described in the procedure of FIGS. 4A-4B.
Figure 28:
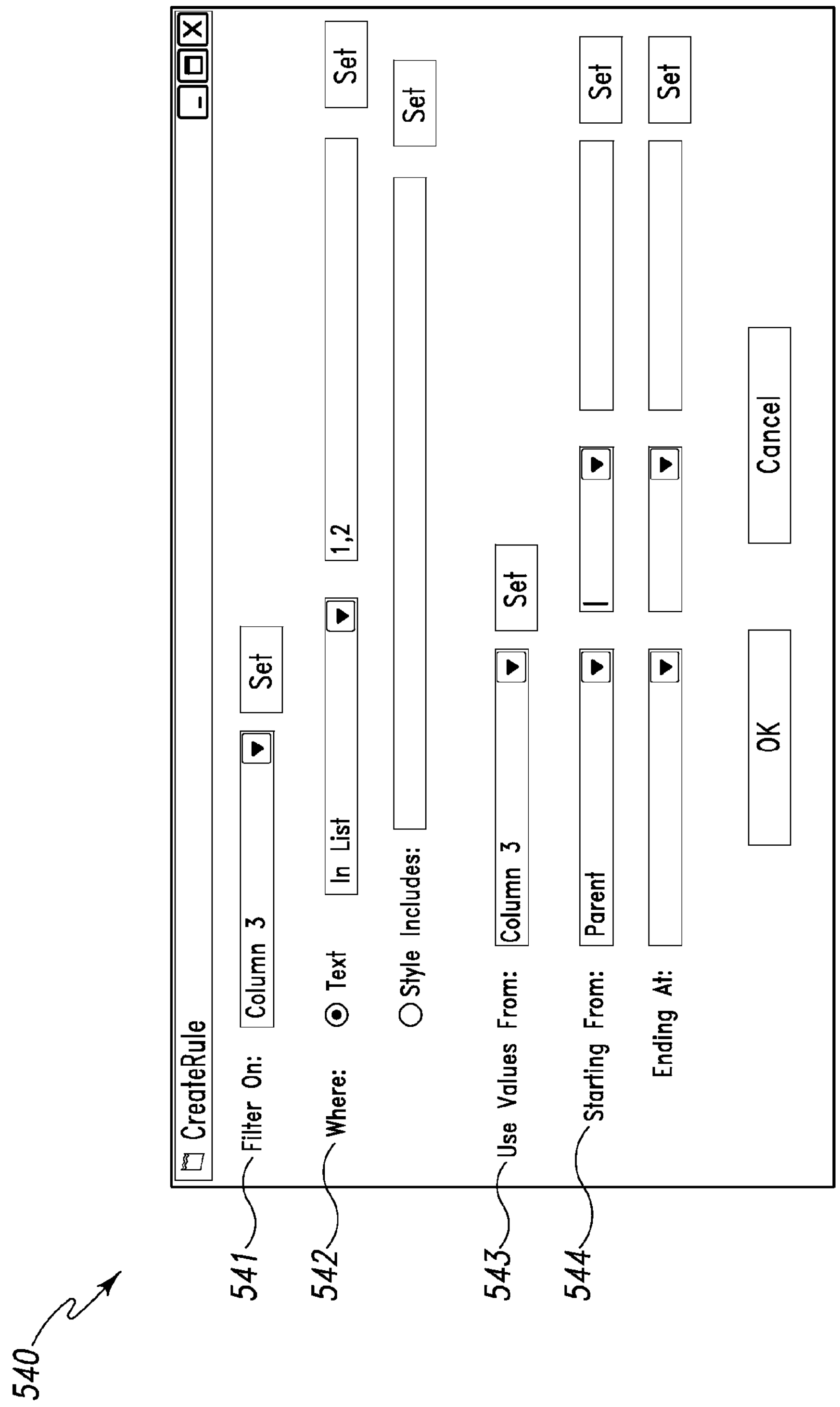
FIG. 28 is a simulated screen of a conversion tool user interface for one or more client workstations of FIG. 1 that illustrates adding another level based on rules, as described in the procedure of FIGS. 4A-4B.

Turning now to FIG. 25, simulated screen 526 is displayed when the user selects the option to create a new dimension. The user specifies the name 527 of the dimension, which in this example is "Period", and whether the dimension corresponds to columns or rows 528 of the data source (stage 148). The simulated screens shown in FIGS. 26-28 illustrate examples of adding the remaining levels for the Period dimension with corresponding rules.

Figure 26:
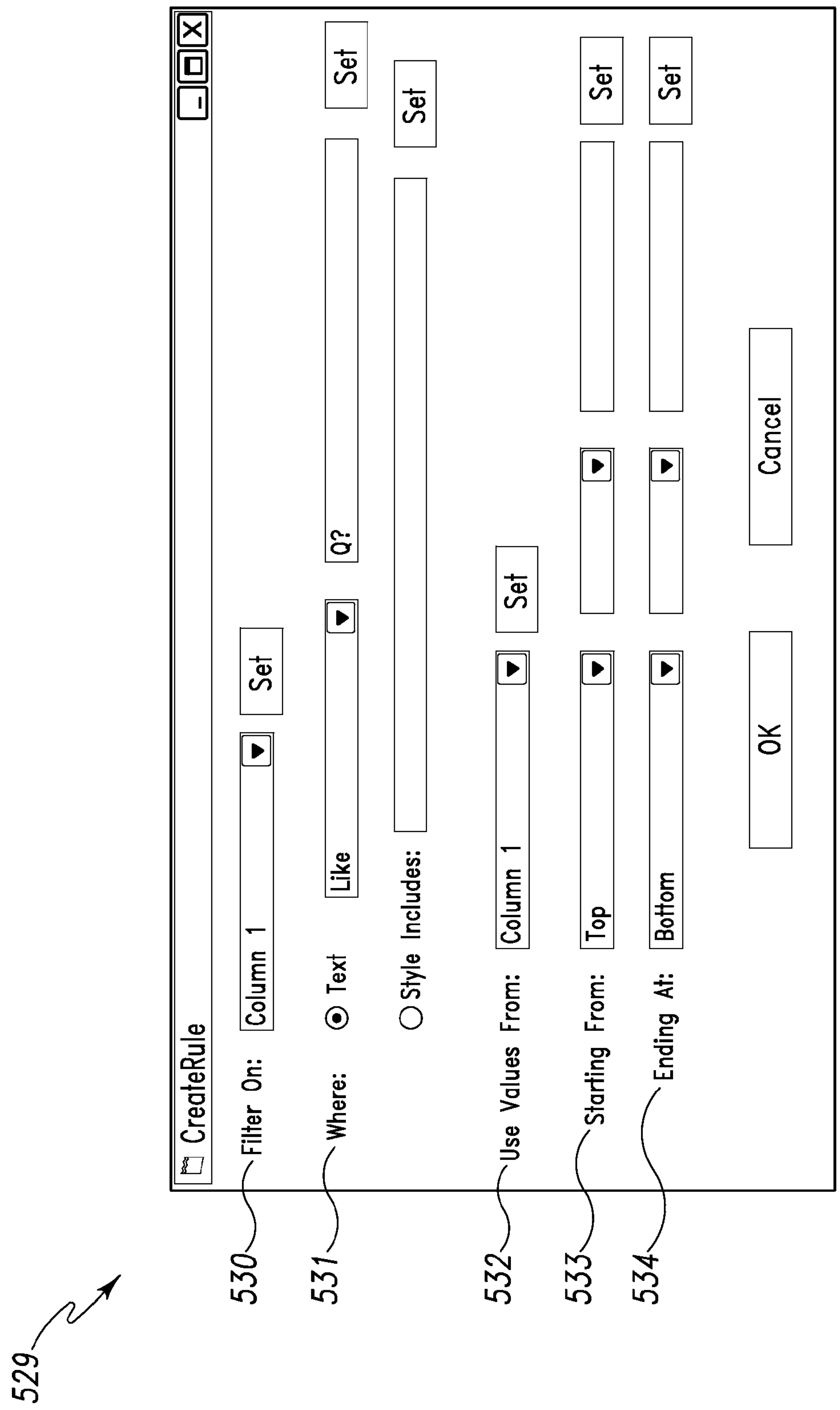
FIG. 26 is a simulated screen of a conversion tool user interface for one or more client workstations of FIG. 1 that illustrates adding a new level based on rules, as described in the procedure of FIGS. 4A-4B.

For example, screen 529 of FIG. 26 illustrates a rule for the Quarter Level that filters on Column 1 (530), where the text is like Q? (531), using values from Column 1 (532), starting from top (533) and ending at the bottom (534). This means that the values Q1 and Q2 from FIG. 9 will satisfy the rule. There are many other options available for creating rules. The "where" section 531 can include the following options for text, as a few non-limiting examples:

Equals
Like
Starts With
In List
Not Equal
RegEx

Alternatively or additionally, the filter may be based on style attributes of a cell. In this case the cascading style sheet (CSS) style string and/or attributes of HTML tags are provided and any cell containing at least these attributes will be included. As a few non-limiting examples, the starting 533 and ending 534 boundaries can have the following options:

Top+/−Number
Parent+/−Number
Text (with the same options as above)
Style (with same CSS options as above)

The set button to the right of the text boxes allows the user to fill in the text box based on a selected element from the document rather than manually typing it in. In the case that a column or row is required, it is determined based on which column or row the selected cell is in. For style, the style attributes of the selected elements are used. For the "In List" function, the text from each selected cell is placed as a comma delimited list into the text box.

Screen 535 on FIG. 27 illustrates a rule for the Month Level that filters on Column 2 (536), where the text is one of the items in the month list (537), using values from Column 2 (538) starting from the parent (539).

Screen 540 of FIG. 28 illustrates a rule for Semi-Month Level that filters on Column 3 (541), where the text is one of the items in the semi-month list (542), using values from column 3 (543) starting from the parent (544). Since this is the final level, each cell that meets the criteria for membership will have child nodes consisting of all cells in the corresponding row which are not part of a rule for the dimension. For example, the path "Q1-January-1" will implicitly be associated with the elements currently containing the values 125, 343, 432 and 34 since they are in the same row and also in columns that are not referenced by a rule in this dimension. Note that the remaining dimensions and measures for the data source of FIG. 9 are not shown to preserve clarity, but follow a similar format. These rules are then used in generating the multi-dimensional cube from the dynamic data source as described herein.

Figure 29:
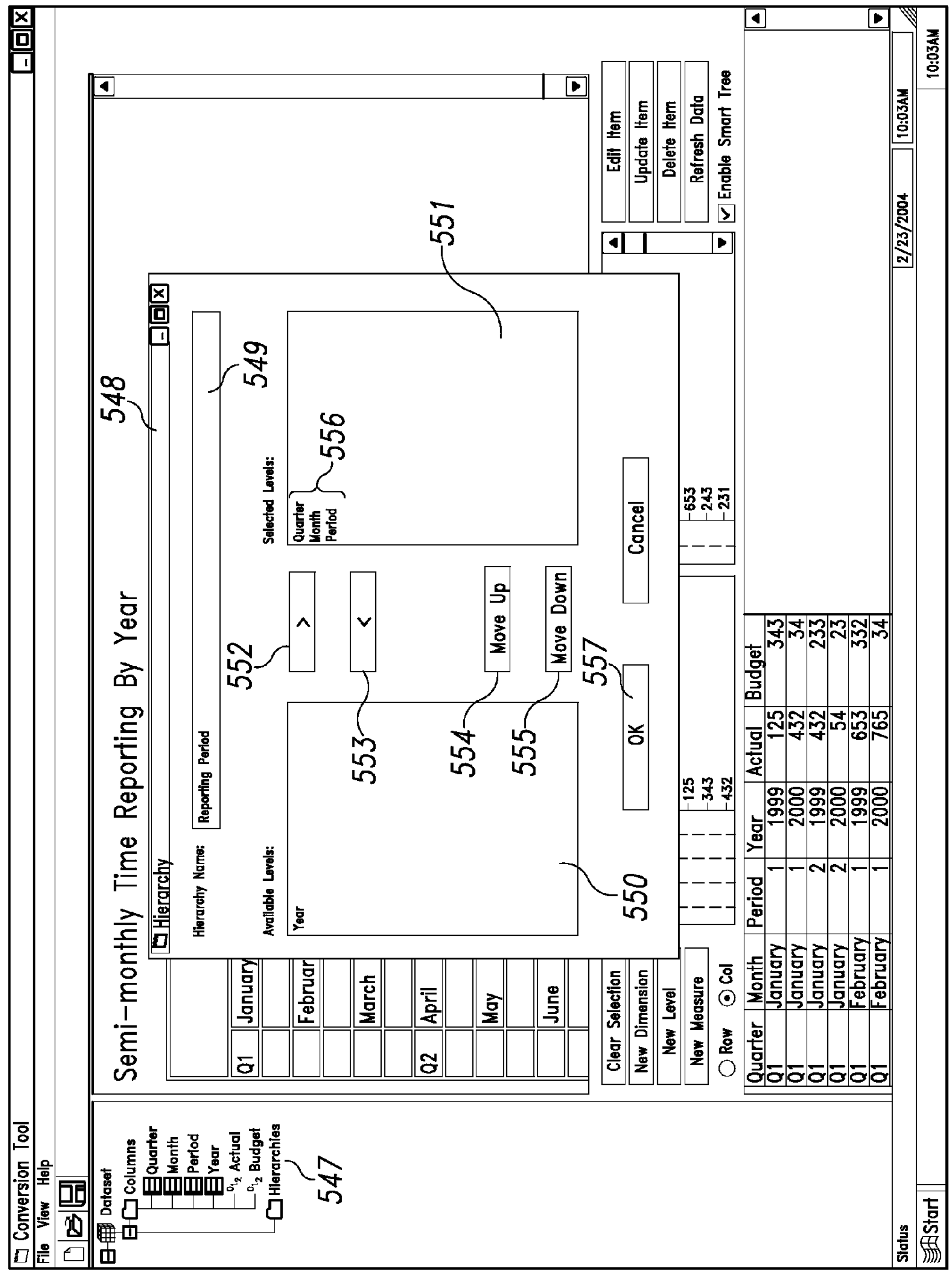
FIG. 29 is a simulated screen of a conversion tool user interface for one or more client workstations of FIG. 1 illustrating customizing the drill-down hierarchies of the template, as described in the procedure of FIG. 5.

The simulated screen 546 of FIG. 29 illustrates customizing the drill-down hierarchies of the template, as described in the procedures of FIG. 5 (stage 172). This user interface can be used with recordsets generated from either or both of the static and dynamic data source modes described herein. The hierarchies specify the levels at which a user in an application can drill-down into the data in a content window. The implementation of hierarchies will be illustrated in more detail in FIG. 31. To specify hierarchy settings, the user selects the hierarchies node 547 and a dialog box 548 is then displayed. The hierarchy is given a name 549, and available levels 550 can be selected and added to the selected levels 556 box by using the add option 552. Selected levels 556 can be removed using the remove option 553. The order of the selected levels 556 can be modified using the move up option 554 and the move down option 555. Once the desired hierarchy has been specified, the user selects the OK option 557 to save the changes. After the user is finished customizing the template, the changes to the template are saved (stage 174). In this example, assume the template is saved under a recordset name "Plan Vs. Actual."

Figure 30:
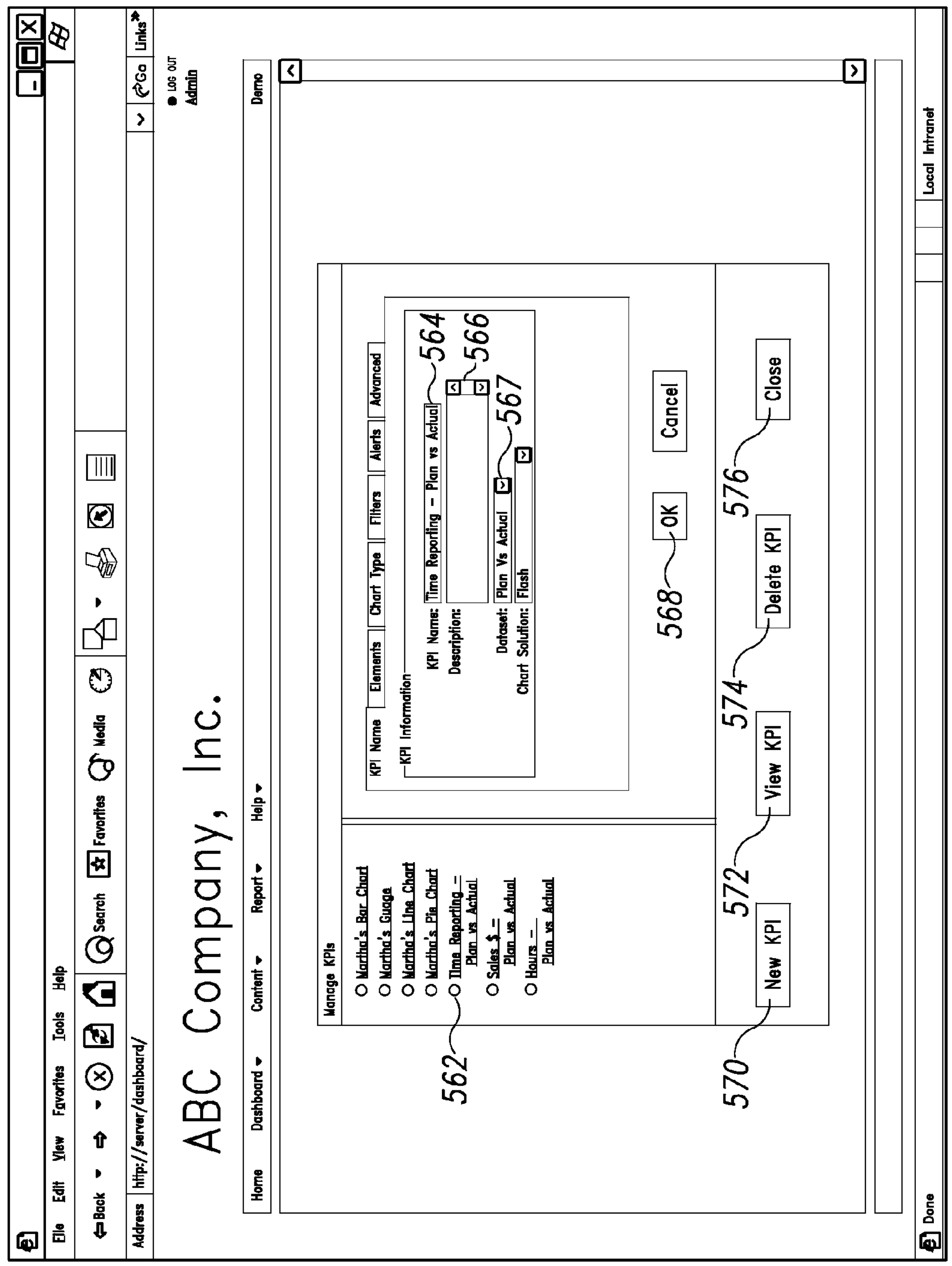
FIG. 30 is a simulated screen of a browser user interface administrative tool for one or more client workstations of FIG. 1 illustrating building a key performance indicator from a template, as described in the procedure of FIG. 8.

Turning now to FIG. 30, a simulated screen of a browser user interface administrative tool 560 is displayed. This user interface can be used with recordsets generated from either or both of the static and dynamic data source modes described herein. From this user interface 560, a user such as an administrator or business analyst can build a key performance indicator (KPI) from at least one of the templates created as described herein, and in accordance with the procedure of FIG. 8. To continue with the current example, the user has selected Time Reporting—Plan vs Actual 562 to modify. The current KPI Name 564 is displayed, along with the description 566, dataset/recordset source 567, and other settings. The Time Reporting—Plan vs Actual KPI 564 points to the Plan Vs. Actual recordset template 567 created in the examples illustrated in FIGS. 9-29 (stage 226). When the user is finished modifying the settings for the selected KPI, the OK option 568 is selected (stage 228). Various options can be used to manage KPI's, such as New KPI 570, View KPI 572, Delete KPI 574, and Close 576.

Figure 31:
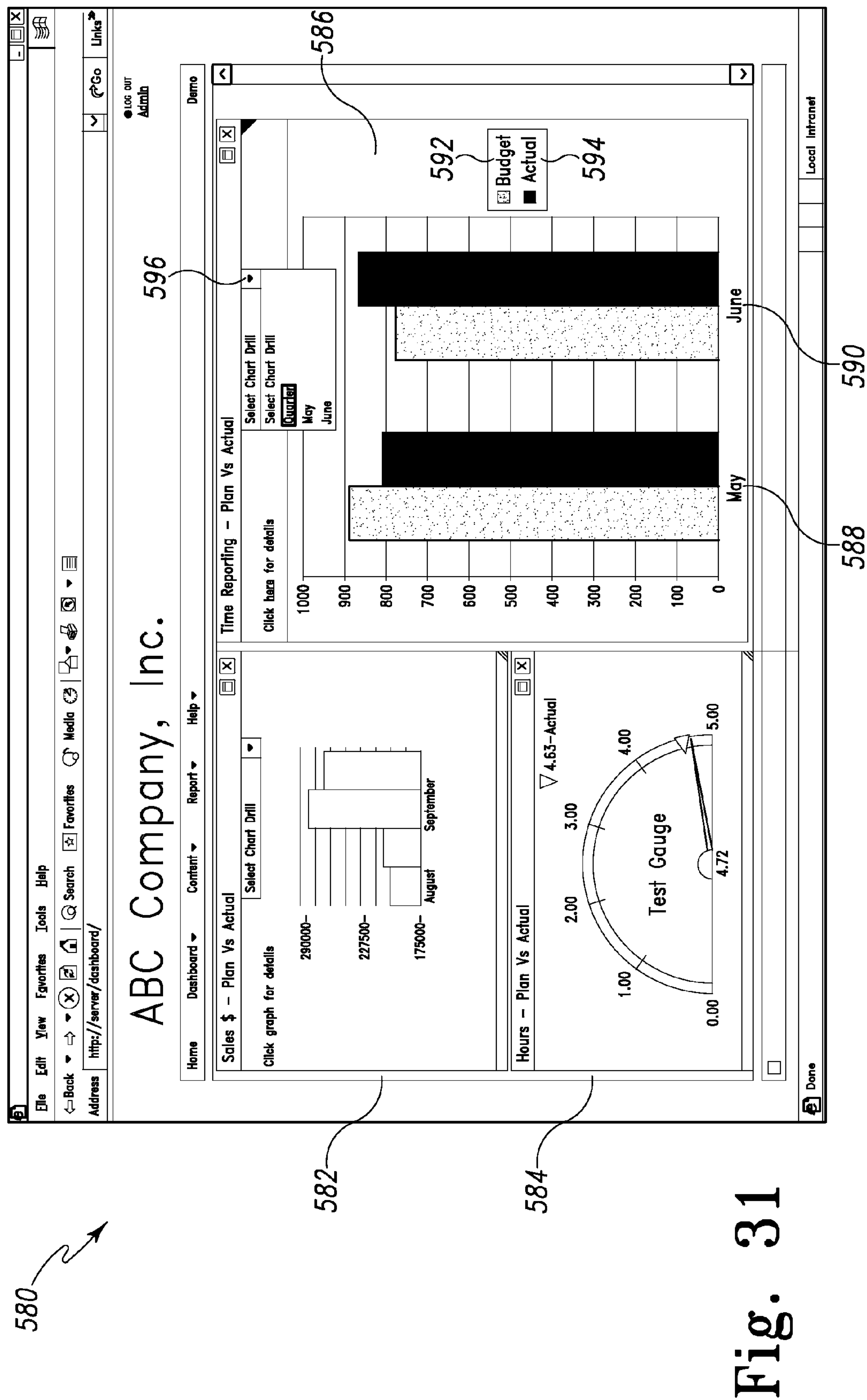
FIG. 31 is a simulated screen of a browser dashboard user interface for one or more client workstations of FIG. 1 illustrating displaying data in one of the content windows that was retrieved using the template, as described in the procedure of FIG. 8.

One or more KPI's are assigned to content windows that will be displayed to a user (stage 230). As shown in FIG. 31, a simulated screen of a browser dashboard user interface 580 illustrates displaying multiple content windows 582, 584, and 586. Data displayed in content window 586 (stage 232) was retrieved from the current data in the data source using the Plan Vs. Actual recordset template created in FIGS. 7-22. The year being illustrated is "1999", and the levels May 588 and June 590 were summed for both semi-months for display in the bar graph. The legend identifies the data as budget 592 and actual 594 values. The hierarchies that were created previously in FIG. 29 are displayed in the "select chart drill" drop-down list 596. As the user selects a given option in the drop-down list 596, the data in content window 586 drills up or down accordingly (stage 234).

In one embodiment, a method is disclosed that comprises: identifying a data source; mapping a plurality of data elements from the data source to a multi-dimensional cube; transforming the multi-dimensional cube into a test recordset to determine if the plurality of data elements are mapped correctly; saving the mapping information to a template; and generating a final recordset from the data source using the template.

In yet another embodiment, a method is disclosed that comprises: identifying a data source; mapping a plurality of data elements from the data source to a multi-dimensional cube by creating at least one dimension, creating at least one level for each dimension, adding a first set of values to a selected one of the at least one level for each dimension, creating at least one measure, and adding a second set of values to the at least one measure; transforming the multi-dimensional cube into a test recordset by determining a plurality of intersections in a plurality of dimension trees in the multi-dimensional cube and building the test recordset from the intersections; saving the mapping information to a template; generating a final recordset from the data source using the template by determining a plurality of intersections in the plurality of dimension trees in the multi-dimensional cube and building the final recordset from the intersections; and using at least part of the final recordset in an application.

In a further embodiment, a system is disclosed that comprises: one or more servers; one or more conversion tools coupled to the one or more servers over a network; one or more client computers coupled to the server over a network; wherein said one or more conversion tools are operable to map a plurality of data elements from a data source to a multi-dimensional cube, transform the multi-dimensional cube into a test recordset to determine if the plurality of data elements are mapped correctly, and save the mapping information to a template that is accessible by the one or more servers; and wherein one or more of said servers contain business logic that is operable to obtain a final recordset from the data source using the template and to send at least part of the final recordset to a user interface for display.

In another embodiment, an apparatus is disclosed that comprises: a device encoded with logic executable by one or more processors to: map a plurality of data elements from a data source to a multi-dimensional cube, transform the multi-dimensional cube into a test recordset, and save the mapping information to a template that allows the recordset to be generated and sent to other applications upon request.

A person of ordinary skill in the computer software art will recognize that the client and/or server arrangements, user interface screen content, and data layouts could be organized differently to include fewer or additional options or features than as portrayed in the illustrations and still be within the spirit of the invention.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A method comprising:

identifying an unstructured data source;

receiving from the user at least one user-defined data dimension indicated by a plurality of data elements within the unstructured data source;

mapping a plurality of data elements from the data source to a multi-dimensional cube based upon said at least one user-defined dimension, wherein the mapping step includes:

creating at least one level for a user-defined dimension;

adding a first set of values to a selected one of the at least one level for each user-defined dimension;

creating at least one measure representing a type of data within the at least one data source; and adding a second set of values selected from the data source to the at least one measure; wherein at least one value in the second set is associated with at least one value selected from the first set;

transforming the multi-dimensional cube into a test recordset to determine if the plurality of data elements are mapped correctly;

saving the mapping information to a template; and generating a final recordset from the data source using the template.

2. The method of claim 1, further comprising:

using at least part of the final recordset in an application.

3. The method of claim 2, wherein the application is a digital dashboard with multiple content windows and at least part of the final recordset is displayed in one of the content windows.

4. The method of claim 1, wherein the data source is electronic.

5. The method of claim 4, wherein the data source is an HTML document.

6. The method of claim 5, wherein the HTML document has a dynamic layout.

7. The method of claim 6, further comprising the step of specifying at least one rule that is applied to the data elements to generate the multi-dimensional cube prior to said transforming.

8. The method of claim 7, wherein said at least one rule selects data elements based upon string matching.

9. The method of claim 1, wherein the data source is unstructured.

10. The method of claim 1, wherein the selected one of the at least one level is a lowest level.

11. The method of claim 1, wherein the first set of values and the second set of values have at least some overlapping values.

12. The method of claim 1, wherein the transforming and generating steps each include:

determining a plurality of intersections in a plurality of dimension trees in the multi-dimensional cube; and building the respective test or final recordset from the intersections.

13. The method of claim 12, wherein the intersections are determined by overlapping positions of the data elements in the multi-dimensional cube.

14. The method of claim 12, wherein the determining step includes:

selecting a dimension tree of the plurality of dimension trees to use as a main tree; and using the main tree as a driving force to determine the plurality of intersections.

15. A method comprising:

identifying an unstructured electronic data source;

mapping a plurality of data elements from the data source to a multi-dimensional cube by creating at least one user-specified data dimension as indicated by the plurality of data elements, creating at least one level for each dimension, adding a first set of values to a selected one of the at least one level for each dimension, creating at least one measure, and adding a second set of values to the at least one measure;

transforming the multi-dimensional cube into a test recordset by determining a plurality of intersections in a plurality of dimension trees in the multi-dimensional cube and building the test recordset from the intersections;

saving the mapping information to a template;

generating a final recordset from the data source using the template by determining a plurality of intersections in the plurality of dimension trees in the multi-dimensional cube and building the final recordset from the intersections; and using at least part of the final recordset in an application.

16. The method of claim 15, wherein at least one value in the second set is associated with at least one value selected from the first set.

17. The method of claim 16, wherein each value in the second set is associated with at least one value selected from the first set.

18. The method of claim 15, wherein the multi-dimensional cube is an OLAP cube.

19. A system comprising:

one or more servers;

one or more client computers coupled to the server over a network, wherein each client computer includes a conversion tool interface;

wherein said conversion tool interface is operable to:

map a plurality of data elements from an unstructured data source to a multi-dimensional cube by creating at least one user-specified data dimension as indicated by the plurality of data elements, creating at least one level for each dimension, adding a first set of values to a selected one of the at least one level for each dimension, creating at least one measure, and adding a second set of values to the at least one measure;

transform the multi-dimensional cube into a test recordset to determine if the plurality of data elements are mapped correctly; and save the mapping information to a template that is accessible by the one or more servers;

wherein one or more of said servers contain business logic that is operable to obtain a final recordset from the data source using the template and to send at least part of the final recordset to a user interface for display.

20. The system of claim 19, wherein at least one of said client computers is operable to display the user interface in a digital dashboard format with multiple content windows and at least part of the final recordset being displayed in one of the content windows.

* * * * *